US011685582B2

United States Patent
Neagu et al.

(10) Patent No.: US 11,685,582 B2
(45) Date of Patent: Jun. 27, 2023

(54) METHOD OF MANUFACTURING OF A FOAM-FORMED CELLULOSIC FIBRE MATERIAL, SHEET AND LAMINATED PACKAGING MATERIAL

(71) Applicant: TETRA LAVAL HOLDINGS & FINANCE S.A., Pully (CH)

(72) Inventors: Cristian Neagu, Epalinges (CH); Katarina Jonasson, Bjärred (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 6 days.

(21) Appl. No.: 16/339,800

(22) PCT Filed: Oct. 13, 2017

(86) PCT No.: PCT/EP2017/076147
§ 371 (c)(1),
(2) Date: Apr. 5, 2019

(87) PCT Pub. No.: WO2018/069482
PCT Pub. Date: Apr. 19, 2018

(65) Prior Publication Data
US 2020/0039713 A1 Feb. 6, 2020

(30) Foreign Application Priority Data

Oct. 14, 2016 (EP) ..................... 16193833
Mar. 24, 2017 (EP) ..................... 17162841
Mar. 24, 2017 (EP) ..................... 17162845

(51) Int. Cl.
| B65D 65/40 | (2006.01) |
| B32B 15/085 | (2006.01) |
| B32B 7/12 | (2006.01) |
| B32B 15/20 | (2006.01) |
| B32B 27/10 | (2006.01) |
| B32B 27/32 | (2006.01) |
| B32B 29/00 | (2006.01) |
| D21H 11/20 | (2006.01) |
| D21H 21/24 | (2006.01) |
| D21H 21/56 | (2006.01) |
| D21H 27/10 | (2006.01) |
| D21H 27/36 | (2006.01) |
| D21H 27/38 | (2006.01) |
| C08J 9/35 | (2006.01) |
| B29C 44/02 | (2006.01) |

(52) U.S. Cl.
CPC ............. *B65D 65/40* (2013.01); *B29C 44/02* (2013.01); *B32B 7/12* (2013.01); *B32B 15/085* (2013.01); *B32B 15/20* (2013.01); *B32B 27/10* (2013.01); *B32B 27/327* (2013.01); *B32B 29/005* (2013.01); *C08J 9/35* (2013.01); *D21H 11/20* (2013.01); *D21H 21/24* (2013.01); *D21H 21/56* (2013.01); *D21H 27/10* (2013.01); *D21H 27/36* (2013.01); *D21H 27/38* (2013.01); *B32B 2262/067* (2013.01); *B32B 2270/00* (2013.01); *B32B 2307/54* (2013.01); *B32B 2307/72* (2013.01); *B32B 2307/7244* (2013.01); *B32B 2307/748* (2013.01); *B32B 2439/70* (2013.01)

(58) Field of Classification Search
CPC ........ B65D 65/40; B65D 85/72; B29C 44/02; C08J 9/35; B32B 7/12; B32B 15/085; B32B 15/20; B32B 27/10; B32B 27/327; B32B 29/005; B32B 2262/067; B32B 2270/00; B32B 2307/54; B32B 2307/72; B32B 2307/7244; B32B 2307/748; B32B 2439/70; B32B 2262/062; B32B 27/32; D21H 11/20; D21H 21/24; D21H 21/56; D21H 27/10; D21H 27/36; D21H 27/38; D21H 27/34; D21H 21/22
See application file for complete search history.

(56) References Cited

U.S. PATENT DOCUMENTS

| 2013/0025807 A1 | 1/2013 | Wernersson et al. |
| 2015/0096700 A1 | 4/2015 | Heiskanen et al. |

FOREIGN PATENT DOCUMENTS

| EP | 2949597 A1 | 12/2015 |
| GB | 1397308 A | 6/1975 |
| JP | 11-323783 | * 11/1999 |
| WO | 2012163753 A1 | 12/2012 |

(Continued)

OTHER PUBLICATIONS

Duran, Veronica Lopez et al., On the relationship between fibre composition and material properties following periodate oxidation and borohydride reduction of lignocellulosic fibres, Cellulose, Sep. 2, 2016, 23, 3495-3510.*

(Continued)

*Primary Examiner* — Irina S Zemel
(74) *Attorney, Agent, or Firm* — Buchanan Ingersoll & Rooney PC

(57) ABSTRACT

The invention relates to a method of manufacturing a new low density foam-formed cellulose material comprising dialcohol-modified celllulose, and to bulk sheets, layers, laminates or moulded articles comprising such material. Furthermore, the invention relates to a laminated packaging material comprising a layer or sheet comprising the low density cellulose material as well as to packaging containers comprising the laminated packaging material. In particular, the invention relates to packaging containers intended for liquid or semi-liquid food packaging, comprising the laminated packaging material.

20 Claims, 12 Drawing Sheets

(56) References Cited

FOREIGN PATENT DOCUMENTS

WO          2015181281 A1    12/2015
WO    WO-2015181281 A1 *  12/2015   ............ B32B 29/06

OTHER PUBLICATIONS

Kasai et al., "Mechanical properties of films made from dialcohol cellulose prepared by homogeneous periodate oxidation" Cellulose, vol. 21, No. 1, Dec. 31, 2013 (Dec. 31, 2013), pp. 769-776.*
Durán, et al., "On the relationship between fibre composition and material properties foil owing periodate oxidation and borohydride reduction of lignocellulosic fibres", Cellulose, Sep. 2016, pp. 3495-3510, vol. 23.
International Search Report (PCT/ISA/210) and Written Opinion (PCT/ISA/237) dated Dec. 4, 2017, by the European Patent Office as the International Searching Authority for International Application No. PCT/EP2017/076147.

* cited by examiner

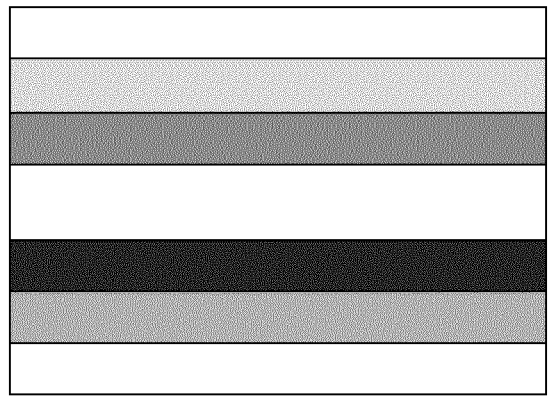
Fig. 2a            (20a)
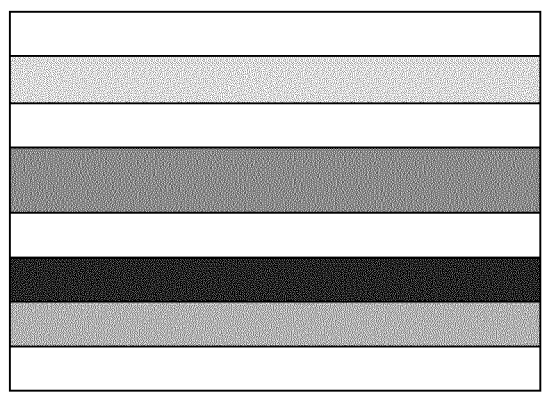
Fig. 2b            (20b)

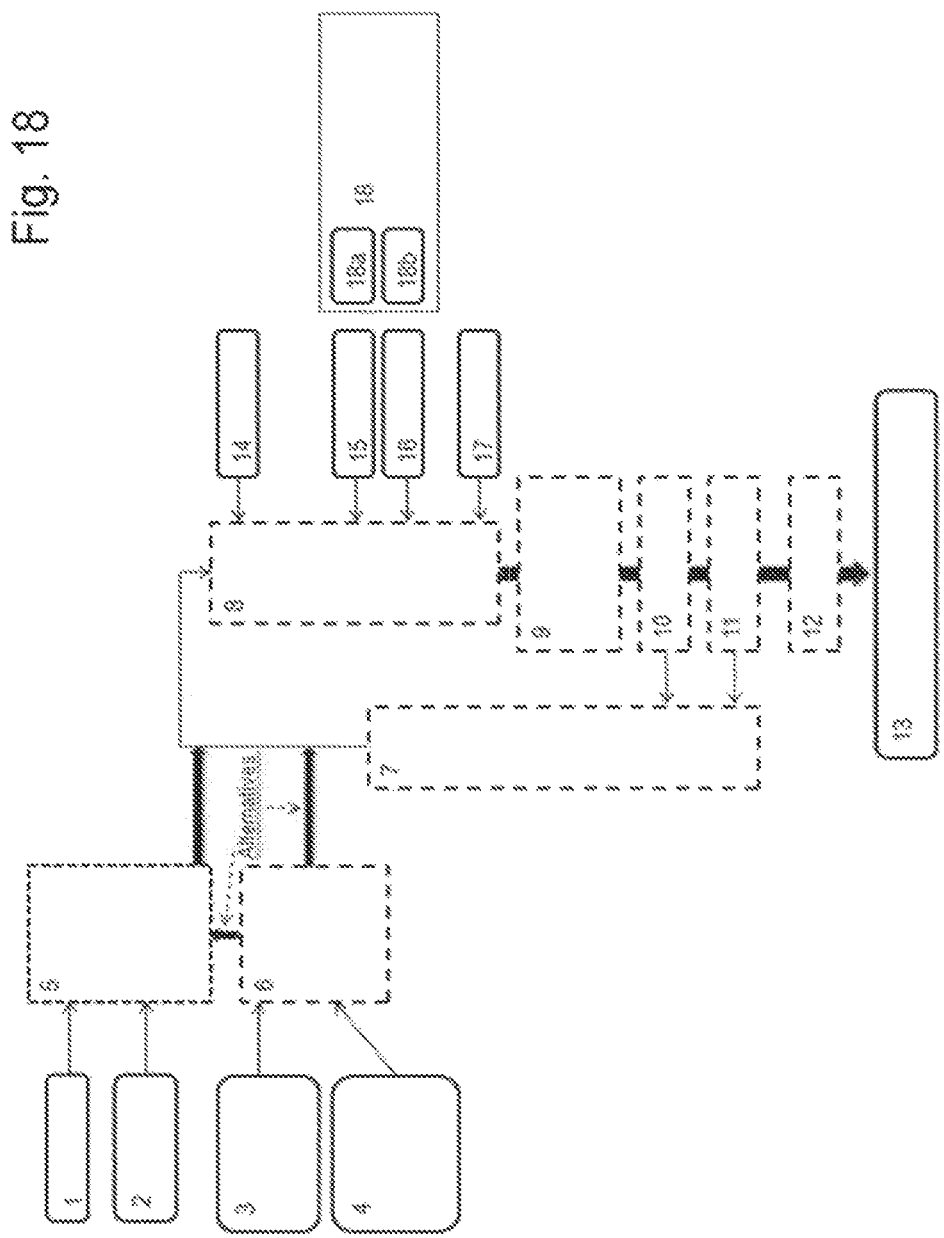

METHOD OF MANUFACTURING OF A FOAM-FORMED CELLULOSIC FIBRE MATERIAL, SHEET AND LAMINATED PACKAGING MATERIAL

TECHNICAL FIELD

The present invention relates to a method of manufacturing a new foam-formed low density cellulose fibre material. The invention also relates to a new foam-formed low density cellulose fibre material and to bulk sheets or moulded articles comprising such material.

Furthermore, the invention relates to a laminated packaging material comprising a layer or sheet comprising the low density cellulose material as well as to packaging containers comprising the laminated packaging material. Further, the invention relates to packaging containers intended for liquid or semi-liquid food packaging, comprising the laminated packaging material.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Decreasing the costs of today's packaging material further, can be made by down-gauging the thickness of the polymer layers or by seeking to replace the aluminium foil barrier by one or more different barrier layers.

A way of saving costs, which has hitherto not been seen as practical in the field of liquid carton packaging, could be by down-gauging the cellulose-based bulk layer by type and/or amount of cellulose fibre material. It normally would lead to the important properties of mechanical strength and packaging integrity, as well as material barrier properties, being jeopardized and has previously been considered as a less favourable way forward. The paperboard is a major component of liquid carton packaging material, however also representing a major part of the total packaging material costs.

In a recently published International patent application No. WO2015/181281 by Applicant, a low-density material of fibrous cellulose was incorporated into a laminated packaging material for similar packaging purposes. It was seen that such a material would provide the necessary criteria of a bulk layer for laminated sandwich materials, including sufficient delamination strength of the material, as determined by the Huygen Internal Bonding Energy testing device in accordance with TAPPI T569. There is however a need to provide such materials with further improved mechanical properties, in particular delamination strength, while at the same time the density of the material is not increased, e.g. by added fibers or chemical strength additives.

It is therefore an object to provide a foam-formed low density fibrous cellulose material and a method for manufacturing it, which fulfils the above described need.

It is another object to produce such a foam-formed cellulose fibre material, which has retained bulk thickness and low density on the one hand, as well as appropriate or improved mechanical durability, such as delamination strength and z-directional compression resistance, without having to add large amounts of strengthening polymer additives or other additives which may be deteriorating other properties of the material or increasing the density of the foam-formed celluose.

It is a further object to produce a laminated packaging material, having a bulk layer comprising the foam-formed fibrous cellulose material, which endures heat-pressure lamination without losing too much of its original thickness during lamination operations and, thus, provides an adequate bulk thickness in the final laminate at a low density of the bulk material and in addition has improved delamination strength of the foam-formed material.

It is a further object to design such a light and cost efficient and mechanically strong laminated packaging material, provided with a print surface, gas barrier properties and having generally good mechanical durability.

SUMMARY OF THE INVENTION

Described hereinafter are aspects relating to an improved so-called foamed, or foam-formed material of cellulose fibres, and to a bulk layer comprising such a foam-formed cellulose fibre material for use in a laminated packaging material which in detail is discussed and exemplified herein, and to a method of manufacturing the foam-formed cellulose fibre material.

Additionally, some aspects are relating to the use of the packaging material in providing packaging containers suitable for liquid and semi-liquid food products. The packaging material is in one aspect used in a filling machine for liquid or semi-liquid food products, for example of the form-fill-seal type, such as a Tetra Pak® A3 filling machine, for manufacture of aseptic packaging containers. In some aspects the packaging containers are manufactured from a roll-fed web of packaging material. In some aspects the packaging containers are manufactured from a blank of packaging material.

According to a first aspect, a method is thus provided for manufacturing a foam-formed low density material of cellulose fibres, comprising the steps of a) forming an aqueous foam comprising water and a foaming agent, b) adding modified cellulose, the modified cellulose containing dialcohol cellulose, i.e. being chemically modified to contain dialcohol cellulose, c) distributing the fibrous foam composition onto a substrate or into a mould, d) reducing the amount of water in the distributed fibrous foam composition to obtain the foam-formed low-density material of cellulose fibres in its final shape, and optionally e), drying the foam-formed low density material of cellulose fibres.

More specifically, a method is provided for manufacturing a foam-formed low density material of cellulose fibres, having improved delamination strength, as determined in accordance with TAPPI T569, comprising the steps of forming an aqueous foam composition comprising water and a foaming agent, adding cellulose fibres to the aqueous foam composition, thus forming a fibrous foam composition, the cellulose fibres comprising modified cellulose, wherein the modified cellulose is chemically modified to contain dialcohol cellulose, distributing the fibrous foam composition onto a substrate or into a mould for acquiring a final shape, dewatering the thus distributed fibrous foam composition into a moist fibrous material, while acquiring the final flat or moulded shape, and drying the moist fibrous material to obtain the foam-formed low density material of cellulose fibres.

According to an embodiment, a method is provided, wherein, in the second step b), the cellulose fibres are added as coarse cellulose fibres and a cellulose reinforcement fraction of modified cellulose fibres, the modified cellulose fibres containing dialcohol cellulose, i.e. being chemically modified to contain dialcohol cellulose.

In some instances the foam-formed cellulose fibre material in its final shape is referred to as board. The modified cellulose containing dialcohol cellulose is obtainable by a method comprising partly and selectively oxidizing the natural (i.e. original starting material) cellulose in a fibre suspension, into dialdehyde cellulose, and subsequently reducing the dialdehyde cellulose into dialcohol cellulose, to a conversion degree of from 10 to 50%, based on the total number of oxidizable C2-C3 bonds in the unmodified cellulose starting material.

The oxidizing and reducing chemical reactions are further described in "On the relationship between fibre composition and material properties following periodate oxidation and borohydride reduction of lignocellulosic fibres", by Verónica López Durán, Per A. Larsson and Lars Wågberg, as published in Cellulose (2016); Online: 2 Sep. 2016.

The modified fibres are preferably based on bleached, chemical pulp fibres, such as on bleached Kraft fibres. In such fibres, lignin has been removed as far as possible to not disturb the chemical modification reactions.

The thus modified cellulose may be mixed or blended with further, unmodified cellulose. The mixing of modified and unmodified cellulose may be carried out before adding it to the foam, or while mixing the separate streams of cellulose fibres into the foam. Preferably, the non-modified cellulose comprises at least 70 wt % of coarse cellulose, to enable a strong foam-formed material. The foam-formed low-density material of cellulose fibres may have a density from 100 to 700 kg/m$^3$, such as from 100 to 450 kg/m$^3$.

Further, it may have an improved delamination strength higher than 100, such as higher than 140, such as higher than 170 J/m$^2$. Preferably, the delamination strength is from 170 to 220 J/m$^2$.

When the foam-formed material of cellulose fibres has been dried, it may have a final moisture/water content of 12% or below.

The method may further comprise the step of performing hydrophobic sizing by adding alkylketene dimer (AKD), alkyl succinic anhydride (ASA) and/or rosin sizing agent directly before step (c).

Alternatively, the method may further comprise the step of performing hydrophobic sizing by applying sizing agent by spray or by size press on the distributed fibrous foam composition obtained in step (c), wherein the sizing agent comprises alkylketene dimer (AKD) and/or alkyl succinic anhydride (ASA) and/or rosin.

In a second aspect of the invention, a cellulose bulk sheet for a packaging material is provided, comprising the foam-formed material of cellulose fibres resulting from the method of the first aspect.

The cellulose bulk sheet may comprise the foam-formed cellulosic fibre-material according the invention, laminated or arranged in layer contact with a further sheet of a different cellulose material. Such a bulk sheet has the advantage acting as a core in a sandwich material construction and its higher thickness provides the sandwich composite with high bending stiffness due to the overall low density. Further, the bulk layer is structurally strong enough to keep the flanges/skins in their relative positions under out-of-plane loading, i.e. under compression in z-direction, exhibiting low residual strain.

According to one embodiment, the further sheet of a different cellulose material is a paper. Since the further sheet is thinner and stiffer, it can act as a flange/skin in a sandwich composite that carries in-plane compression and tension loads.

The bulk layer or the foam-formed cellulosic fibre-material may have a surface weight grammage of at least 20 g/m². In some embodiments the grammage is between 20 and 440 g/m².

In a third aspect of the invention, a laminated packaging material is provided, comprising a cellulose bulk sheet of the second aspect, wherein the bulk sheet is laminated to at least one layer of polymer, such as a thermoplastic polymer, such as a polyolefin.

The laminated packaging material may further comprise an oxygen barrier, such as an aluminium foil and/or a polymer layer having gas barrier properties.

The oxygen barrier may be a layer made of a polymer film or a thin paper sheet with or without a barrier coating.

In a fourth aspect, a packaging container for liquid- or semi-liquid food is provided, comprising the laminated packaging material of the third aspect.

The invention is applicable to any cellulose fibres, such as wood fibres.

The preferred coarse cellulose fibres may have a Canadian Standard Freeness (CSF) value of 400-750 mL. The coarse cellulosic fibres may have an average fibre length (length weighted) of 1.3 to 2.6 mm. The coarse cellulosic fibres may have an average fibre diameter of 20 to 45 μm. The coarse cellulosic fibres may have a fines content of less than 30%. The term "coarse" in "coarse cellulosic fibres is to be understood as that the pulp fibres have intact, un-collapsed fibre walls, such that the fibres are more stiff and longer than fibres refined to lower freeness or fibres from which the lignin has been partially removed by chemical processes. Thus, coarse fibres are fibres with a fibre wall that is thick enough to withstand the forces applied to the fibres during pressing- and drying processes of paper/web making, otherwise causing the fibres to collapse. Chemical pulps where lignin has been partially removed will have a weaker fibre wall (due to the removal of the lignin) and will collapse during the papermaking process (pressing and drying). Fibres that still contain a sufficient amount of lignin will be able to withstand the process forces and will not collapse, unless they are refined such that the fibre walls have become weaker. In the resulting foam-formed cellulosic fibre-material, the coarse cellulosic fibres functions as a component giving the material its bulky structure. The coarse cellulosic fibres may be selected from the group consisting of mechanical, chemi-mechanical, thermomechanical, chemithermomechanical pulp (CTMP) fibres and Neutral Sulfite Semi Chemical (NSSC) pulp fibres. The mechanical, chemi-mechanical, thermomechanical, chemithermo-mechanical pulp or NSSC pulp fibres may be chosen from the group consisting of groundwood (GW), stone ground wood (SGW), pressure groundwood (PGW), thermomechanical pulp (TMP), high-temperature thermomechanical pulp (HTMP), chemi-mechanical pulp fibres (CMP), CTMP or NSSC pulp fibres. Preferably, the coarse cellulosic fibres are chemithermo-mechanical CTMP pulp fibres. The CTMP fibres are added as a major part of the total amount of cellulose fibres. The CTMP may have a CSF value of 400-750 mL. The CTMP may have an average fibre length (length weighted) of 1.3 to 2.6 mm. The CTMP may have an average fibre diameter of 20 to 45 μm. The CTMP may have a fines content of less than 30%.

In the resulting foam-formed cellulose fibre-material, the cellulose reinforcement fraction of dialcohol-modified cellulose fibres facilitates the binding of the cellulose fibres in subsequent stages of the papermaking process and compensates for the strength loss caused by the low density structure. Moreover, if well retained, the cellulose reinforcement fraction increases the bonding sites and the retention of starch.

Different chemicals are usually used in the paper industry, normally called strengthening agents or aids.

As a further retention additive, a reinforcement fraction of a heavily refined cellulose component may be added, also called and being the same as, a highly refined cellulose fibre component. Such a heavily refined cellulose may have an average fibre length of approximately 0.4 to 0.8 mm, preferably 0.5-0.7 mm, more preferred 0.6-0.65 mm. The heavily refined cellulose may have an average fibre diameter of approximately 20 to 30 μm. It may have a fines (defined as the fraction passing through 200 mesh wire) content below 30%. The cellulose reinforcement fraction may be produced e.g. with a conventional LC-refiner (Low Consistency refiner). The filtration resistance of the cellulose reinforcement fraction measured with the Schopper-Riegler method may be higher than 80 SR, such as 85-95 SR. The cellulose reinforcement fraction is thus larger in dimensions than NFC (nanofibrillated cellulose) or MFC (microfibrillated cellulose), of which the latter has an average fibre length of 100 nm to 0.1 mm and fibre diameter of 3 to 50 nm. The cellulose reinforcement fraction increases the strength of the fibre network because it is highly fibrillated and has therefore large specific surface area and consequently a high number of hydroxyl groups that form the hydrogen bonds between the fibre furnish components. Still, the heavily refined fibres are still parts of fibres, and not reduced to fibrillar cellulose that are of a much smaller size, i.e. on the micro- and/or nanometer scale. The term "fibrillar cellulose" does not encompass "cellulose fines". "Fines" are not equal to "fibrils". Fibrils have a significantly smaller size than fines.

The heavily refined fibre component may be chosen from heavily refined chemical pulp having a Schopper-Riegler (SR) number range higher than SR°80, such as SR°90, and heavily refined chemithermomechanical pulp (hrCTMP) having a CSF less than 70 mL. The heavily refined chemical pulp may have a Schopper-Riegler (SR) number of SR°90. According to an embodiment, the heavily/highly refined pulp may be a pulp selected from sulphite or sulphate (chemical) pulp, as above, and based on hardwood or softwood, heavily refined CTMP pulp as above, or heavily refined NSSC pulp.

The heavily refined chemical pulp may be heavily refined sulphite pulp, heavily refined softwood pulp, heavily refined kraft (sulphate) pulp or heavily refined hardwood pulp (hrHW). In one embodiment the heavily refined reinforcement pulp is hrHW. The hrHW may have a Schopper-Riegler (SR) number of SR°90. One advantage of using hrHW is that hardwood pulp is commercially well available. The hrCTMP may have a CSF value of less than 70 mL. Using such hr fibres has the advantage that it increases the bonded area and therefore produces higher sheet strength.

The first step in producing a foam-formed cellulosic fibre-material involves providing foam comprising cellulose fibres. Such foam may be produced by mixing cellulose fibres and a foaming fluid comprising a liquid and a surfactant. The liquid may be water. Typically, the amount of the surfactant may be from 0.01 to 1000 ppm (weight to weight), such as from 0.01 to 100 ppm, such as from 0.01 to 10 ppm, such as from 0.05 to 10 ppm, such as from 0.1 to 8 ppm. The fibrous foam composition may comprise from 20 to 80 volume % of air. In a further embodiment, the foam composition comprises up to 70 weight-%, such as from 30 to 50 weight-% of water. A rotor mixer or a general foam-generator may be used to generate foam comprising cellulosic fibres. The foam may generally be formed by bringing a gas into the mixture. Air is one example of an appropriate gas. Other suitable gases are oxygen and nitrogen. The gas may be brought into the mixture in the form of pressurized gas and by the vortex caused by stirring.

The fibrous foam composition may be distributed into a mould and subsequently dewatered and dried to obtain a final three-dimensional shape. In this way, due to the improved internal bond strength, i.e. delamination strength, it is possible to produce a three-dimensional article by moulding the aqueous fibrous foam composition without the addition of large amounts of further additives or polymers, for the purpose of internal bonding strength.

The step of reducing the amount of water in the distributed fibrous composition may include dewatering and/or drying. The substrate onto which the fibrous foam composition is distributed may be a wire form or a forming wire. Distribution onto wire form or a forming wire represents one way of dewatering the fibrous foam. After initial dewatering on a forming wire, the foam-formed cellulosic fibre-material (the fibrous web) may be compressed mechanically, in one or several consecutive wet press nips. Subsequently, the resulting dewatered the foam-formed cellulosic fibre-material (the fibrous web) may be dried, using any conventional drying method, such as cylinder drying, impingement drying or Condebelt drying, alternatively equipped with IR (infrared) dryers, to a final moisture content between 0 to 15% (weight/weight).

Compared to traditional paper manufacturing, additional or modified drying may suitably be used in order to achieve the desired dryness and density.

The dewatering operation may be done by pressing and/or suction of water out from the foam-formed cellulose material. In a further embodiment, the drying operation may take place by air drying, forced air blowing, infra-red irradiation or convective drying, or by a combination of any of these said drying methods.

Generally, the cellulose fibres are provided as a liquid dispersion comprising cellulose fibres (a fibre dispersion). The concentration of the cellulose fibres in the liquid dispersion comprising cellulose fibres may be 0.1% to 10% (weight/weight). The liquid dispersion comprising cellulose fibres may be an aqueous dispersion comprising cellulose fibres.

The fibre dispersion may be added to the foaming fluid after foam has been generated from the fluid (including the surfactant).

Alternatively, the liquid dispersion comprising cellulosic fibres may be combined with the foaming fluid prior to foaming.

In the finally obtained, dried foam-formed material of cellulose fibres, the bonding of the fibres to each other is essentially made by hydrogen bonding. The hydrogen bonds may be formed e.g. between hydroxyl groups on the modified, dialcohol cellulose, fibre surfaces. There may be some complementing bonding from including hydrophilic polymers into the composition, however not at the levels of added such polymers that are normally required. The inclusion of polymers makes the cellulose composition harder to recycle and re-use, or degrade than compositions purely from cellulose fibres, and the amount of such added polymers should therefore be reduced as far as possible.

According to an embodiment, the fibrous foam composition comprises from 0.1 to 10 wt % (weight/weight), such as from 0.1 to 7, such as from 0.1 to 5, such as from 0.5 to 5, such as from 0.5 to 4, such as from 0.5 to 3 wt % of cellulose fibres, based on the total wet foam composition.

If necessary, an additive for controlling the consistency of the foam may be added.

According to a general embodiment, any surfactant may be used as foaming agent. The foaming agent may preferably be selected from anionic surfactants, alternatively from nonionic surfactants, amphoteric surfactants and synthetic polymers.

Well working examples of suitable anionic surfactants are sodium lauryl(dodecyl) sulphate (SLS, SDS) and sodium laurylethersulfate (SLES). When SDS is selected as foaming agent, the amount used for the foam-formed cellulose composition is typically from 0.05 to 10, such as from 0.1 to 8 g/l (ppm). SDS is the most economic foaming agent, and approved for use in food grade applications (FDA, BfR), and is preferred.

Suitable examples of nonionic surfactants are alkylpolyoxyethylenes, Spans and Tweens.

Examples of amphoteric surfactants suitable for a foaming agent are Betaines. A suitable polymeric surfactant is polyvinylalcohol, PVA.

The foam-formed cellulosic fibre-material of the invention may further comprise additive amounts (such as below 10 wt %) of other materials, such as strength chemicals or agents, such as starch and derivatives thereof, or carboxymethyl cellulose and derivatives thereof. Such additives may be added to influence the properties of the resulting foam-formed cellulosic fibre-material. Cationic starch may be added in order to further increase the sheet strength. Cationic starch may be added at less than 6 wt % of the cellulose composition, preferably at from 0.5 to 5.5 wt %, such as from 1 to 5 wt %, such as from 1.5 to 4 wt %, such as from 2 to 5 wt %.

According to another embodiment, the cellulose reinforcement fraction has been treated with a cationic dry strength agent. Such treatment increases bonded area in the fibre network and thereby improves the strength. The cationic dry strength agent may be chosen from the group consisting of cationic starch (CS), cationic polyacrylamide (CPAM) and glyoxalated polyacrylamid (GPAM). Other respective cationic agents may also be used, such as polyaminoamid-epichlorohydrine (PAE). Thus, the cellulose reinforcement fraction may be treated, in a separate step, with a cationic dry strength agent, wherein the cationic dry strength agent is chosen from the group consisting of cationic starch (CS), cationic polyacrylamide (CPAM), glyoxalated polyacrylamid (GPAM) and polyaminoamid-epichlorohydrine (PAE).

Preferably, the cellulose reinforcement fraction has been treated with cationic starch as a cationic dry strength agent.

The treatment of the cellulose reinforcement fraction with a cationic strength agent may have been performed before a step of mixing the coarse cellulosic fibres and the cellulose reinforcement fraction to form a cellulose fibre mixture.

Alternatively, instead of treating the cellulose reinforcement fraction with a cationic dry strength agent, the whole cellulose fibre-mixture may be treated with a cationic dry strength agent.

According to another embodiment, the method further comprises the step of mixing the coarse cellulosic fibres and the cellulose reinforcement fraction to form a cellulose fibre mixture; wherein the step of mixing is performed before the step of adding cellulose fibres to the aqueous foam composition. This has the advantage that it is an efficient method to prepare a homogenous fibre mix.

Alternatively, the method further comprises the step of mixing the coarse cellulosic fibres and the cellulose reinforcement fractions to form a cellulose fibre mixture; wherein the step of mixing is performed before the step of adding cellulose fibres to the aqueous foam composition; and wherein the whole cellulose fibre-mixture has been treated with a cationic strengthening agent after the step of mixing the coarse cellulosic fibres and the cellulose reinforcement fraction to form a cellulose fibre mixture.

SDS is an anionic surfactant, i.e. it has a negative charge in an aqueous environment. Furthermore, SDS is an efficient and inexpensive surfactant and is widely used in numerous health-safe applications like shampoos and toothpaste, which require a non-toxic surfactant. In addition, SDS is a very efficient foaming agent and thus the required SDS concentration in pulp suspension to form an acceptable foam is low. The required concentration of nonionic surfactants is typically 10 times higher than the required concentration of SDS. Cationic surfactants adsorb to the anionic sites on fibres and thus their concentration in the web is increased, resulting in a product having a higher surfactant content and a decreased strength. The amount of polyvinyl alcohol (PVA) required to form foam is known to be much higher compared to SDS and thus the amount of surfactant that goes out of the board-making process to the water purification plant will be much higher with PVA. Further, the strength of the product when PVA is used as foaming agent may depend on foaming agent concentration which can cause challenges in the control of product quality if foaming is adjusted with PVA. In addition, the concentration of PVA also affects the strength properties of the resulting material.

SDS is negatively charged which effects cationic process chemicals, e.g. CPAM (cationic polyacrylamide) (retention chemical), cationic starch (dry strength agent) and AKD (alkyl ketene dimer) (sizing agent) (dispersion stabilized typically with cationic polymers). Each of these problems may be independently solved as discussed herein.

When SDS is used as surfactant and the cationic dry strength agent is cationic starch, some unwanted effects for cationic additives might arise. In the air bubble, the anionic SDS molecule is aligned so that the anionic end (i.e. the hydrophilic end) is towards the water phase and hydrophobic end is towards the air phase. Therefore, the air bubbles in the foam have a large surface area with a high negative surface charge. The anionic bubble surface might "compete" with fibres for the adsorption of cationic strengthening aids and cationic retention polymers. Also anionic air bubbles could probably detach cationic polymers that are already adsorbed on the fibre surfaces, particularly if high shear forces exist in the process. Therefore, detrimental effects depend on the delay times in foam, i.e. how long time the cationic strengthening aids and cationic retention polymers are present in the foam, i.e. interacting with the foam. In order to overcome this problem, cationic starch may be added into thick stock (i.e the fibre dispersion or the cellulose fibre mixture) before mixing foam with thick stock. Then SDS does not disturb adsorption of cationic starch onto fibres. The delay time in foam should be short because some extent of desorption occurs in foam. High foam density (600 kg/m$^3$-750 kg/m$^3$) promotes cationic starch retention, when compared to lower foam densities. Alternatively, cationic starch may be added into foam at foam density 600 kg/m$^3$-750 kg/m$^3$. Retention system and dosing manner may be as described below. Starch retention may be increased by good solids retention with increased dosage of CPAM and microparticles as retentions chemicals. Instead of using CPAM and microparticle, a retention system consisting of tannic acid (TA) and polyethyleneoxide (PEO) may be employed.

According to another embodiment, the method further comprises the step of adding a retention system to the fibrous foam composition obtained in the step of adding cellulose fibres to the aqueous foam composition. The retention system may comprise polyethylene oxide (PEO) and tannic acid (TA). Adding a retention system has the effect that less fibres and particles leave the material during the step of reducing the amount of water in the material as they are retained in the material. This increases the quality of the resulting material: as the non-retained material is mostly small by dimensions and well-bonding, its contribution to bonding is significant. In addition, dewatering and the retention of other chemicals are also improved, resulting in savings in raw material and production costs.

In a two-component retention system the additions are preferably made into pipe-line in two separate insertion points with a clear time delay between the points.

The retention system may comprise polyethylene oxide (PEO) and tannic acid (TA). Polyethylene oxide (PEO) and tannic acid (TA) are preferably added in amounts smaller than 450 g/t of dry solids. Polyethylene oxide (PEO) and tannic acid (TA) is a nonionic retention system and thus no interfering interactions occur between opposite charges on an anionic foaming agent such as SDS and the retention system. Preferably the PEO has a molecular weight (MW) of $6 \times 10^6$ to $8 \times 10^6$.

Thus, when the surfactant is an anionic surfactant, e.g. SDS, the preferred retentions system is polyethylene oxide (PEO) and tannic acid (TA). Polyethylene oxide (PEO) and tannic acid (TA) are preferably added in amounts smaller than 450 g/t of dry solids.

The method may comprise the step of adding a retention system to the fibrous foam composition obtained in the second step (b), wherein the retention system may comprise of polyethylene oxide (PEO) and tannic acid (TA).

Instead of tannic acid, any compound containing phenolic groups, e.g. kraft lignin or formaldehyde resin may be used.

Alternatively, the retention system may be a combination of cationic polyacrylamide (CPAM) and microparticles, The latter may have a negative electrostatic charge and a very high surface area. The microparticles may be either polymeric or inorganic or a combination thereof. One example of inorganic microparticles used is bentonite. Preferably, CPAM may be added in an amount smaller than 1000 g/t of dry solids content. Preferably, the microparticles are added in an amount smaller than 1000 g/t of dry solids content. Addition of CPAM and microparticles has the advantage that it improves the solids retention. When using SDS as the foaming agent and CPAM and microparticles as the retention system, cationic charge of CPAM interacts with foamed SDS and thus the effectivity of the retention system decreases. To overcome this problem, an increased amount of CPAM (400 g/t-1000 g/t) may be fed into the head-box feed line before microparticle addition when the foam density is 600 kg/m$^3$-750 kg/m$^3$. Alternatively, to reduce the negative effect described above, CPAM may be fed into the thick stock (i.e the fibre dispersion or the cellulose fibre mixture) before mixing foam with thick stock and feeding micro-particles close to head-box into head-box feeding line.

No further addition of polymers or fibres to the fibrous foam composition is needed in order to enable usage of the obtained foam-formed cellulosic fibre-material for bulk materials in liquid carton packaging materials and laminates.

Sizing agent(s), such as alkyl succinic anhydride (ASA), alkyl ketene dimer (AKD) and rosin, may be added to the fibrous foam composition to improve the board's (i.e. the foam-formed cellulosic fibre-material) hydrophobicity and thereby its water repelling properties. The sizing agent(s) may be added to the fibrous foam composition in amounts up to 4 kg/tonne of dry solids content. In the production of liquid packaging board, the internal sizing is usually done by adding AKD (alkylketene dimer).

According to one embodiment, the method further comprises the step of performing hydrophobic sizing by adding alkylketene dimer (AKD), alkyl succinic anhydride (ASA) and/or rosin sizing directly before the step of distributing the fibrous foam composition onto a substrate or into a mould. Preferably, alkylketene dimer (AKD), alkyl succinic anhydride (ASA) and/or rosin sizing is added less than 20 seconds, preferably less than 10 seconds, such as 7 seconds, before the step of distributing the fibrous foam composition onto a substrate or into a mould. With AKD the dose may be 4 kg/t or less of dry solids content. One advantage of adding the sizing agent at this stage is that the sizing agent has good performance. If added earlier, the surfactant may wash away the sizing agent, resulting in lower hydrophobicity and thus increasing the tendency of the resulting material to absorb liquid when dry. Preferably, the sizing agent(s) is/are added in a total amount of no more than 4 kg/t of dry solids content.

AKD, such as Fennosize KD364M, dosed at 4 kg/tonne of dry solids content (active substance) or less may be added to the foam as closely as possible before the step of distributing the fibrous foam composition onto a substrate or into a mould. Preferably, AKD is added less than 20 seconds, preferably less than 10 seconds, such as 7 seconds, before the step of distributing the fibrous foam composition onto a substrate or into a mould. This sizing agent works efficiently in SDS foam-forming.

Surfactants are known to disturb AKD-sizing. When using SDS as the foaming agent and AKD as the sizing agent the negative charge of SDS probably neutralizes cationically stabilized AKD. Thus, SDS interferes with adsorption of AKD particles onto fibre surfaces. Moreover, the AKD-product has to be compatible to the whole foam forming chemistry. For these reasons, AKD-product has to be selected carefully. The retention system (CPAM and microparticles) as well as cationic starch addition promotes sizing and together with Fennosize KD 364 AKD-product the sufficient sizing level may be achieved. The reason for the compatibility of Fennosize KD 364 and foam forming chemistry could be the proportionally high cationic charge in the stabilization system of AKD Preferably, since AKD-delay, i.e. the residence time of AKD, in the foam may decrease efficiency of sizing, the sizing agent is fed into the foam just before the head box.

According to an alternative embodiment, the method further comprises the step of performing hydrophobic sizing by applying sizing agent by spraying it on the distributed fibrous foam composition obtained in the step of distributing the fibrous foam composition onto a substrate or into a mould, wherein the sizing agent comprises alkylketene dimer (AKD) and/or alkyl succinic anhydride (ASA), and/or rosin. Preferably the sizing agent(s) is/are added in a total amount of no more than 4 kg/t of dry solids content. One advantage of adding the sizing agent as a spray is that it further minimizes the AKD washing-out effect of the surfactant by further reducing shear forces and exposure time to the shear.

According to one embodiment, the density of the fibrous foam composition to be reduced from an amount of water is approximately 600 to 750 kg/m$^3$. The average bubble size may be 100 µm or below. Thus, before the amount of water has been reduced in step (d), the density of the fibrous foam composition is approximately 600-750 kg/m$^3$. This has the advantage that at this density the SDS content does not interact too much with the cationic chemicals, ensuring target level strength properties for board. At the same time the foam quality is good enough to produce acceptable formation. After the amount of water has been reduced (step (d)), the foam-formed cellulosic fibre-material has obtained its final shape and contains no or negligible amount of foam. After the amount of water has been reduced, the density of the foam-formed cellulosic fibre-material (the board) preferably is 450 kg/m$^3$ or less, preferably 250-350 kg/m$^3$, such as 300 kg/m$^3$.

According to another embodiment, the average bubble size of the fibrous foam composition is 100 µm or below, such 80 µm or below, such as 60 µm or below. This has the advantage that bubbles keep individual fibres separated and thereby fibre flocs are not generated, leading to good formation of the material typically having a specific formation, i.e. formation number or the standard deviation of the local grammage normalised with the grammage, measured according to SCAN-P 92:09 below 1.0 √g/m. The bubble radius may be determined as Sauter mean diameter D [3, 2], using optical measurement and averaging the diameter of measured bubbles.

The foam comprising cellulosic fibres generated as described above may be run through a nozzle arrangement ("headbox") where pressure and forming tools generate a web of foam-formed cellulosic fibre-material. Headbox nozzle distributes the fibre foam evenly in cross-direction on a forming wire and subsequent dewatering elements increase the solids content, typically to 15 to 20% (weight/weight) after the forming section. After this, the web may be mechanically compressed to reach solids content level of 30 to 55%. To reach the final solids content target (typically 85 to 95%) the web may be dried by using drying units such as hot cylinders, infra-red dryers or Condebelt dryer. Finally, base board may be rolled onto a reel, wound to customer-width reels and stored, before future use to prepare for example a packaging material.

Since such a material comprises less cellulosic fibres than conventional material while still having the desired properties needed, the material costs are lower compared to when a conventional material is used for the same application.

The foam-formed cellulosic fibre-material according to the present invention has further improved internal bond strength, i.e. delamination strength, as compared to the corresponding foam-formed cellulose not comprising a heavily refined fibre pulp in its composition. In addition, it has also improved resistance to compression in thickness direction, i.e. reduced residual strain.

The foam-formed cellulosic fibre-material according to the present invention may be manufactured according to the method according to the present invention.

The present invention also relates to a foam-formed cellulosic fibre-material obtained by the method according to the present invention.

The foam-formed cellulosic fibre-material according to the present invention may be defined as having a density of at most 450 kg/m$^3$, a grammage of at least 20 g/m$^2$, a delamination strength of at least 100 J/m$^2$, a z-strength of at least 150 kPa, and a residual strain (i.e. remaining thickness reduction after z-directional compression) of 3 to 8% with a single loading of 2 MPa.

The foam-formed cellulosic fibre-material according to the present invention is thermally stable above 300° C. and has a low heat transfer, as opposed to foamed polymer layers in general. It has been observed that at relatively low densities of from 200 to 450 kg/m$^3$, a foam-formed cellulosic fibre-material sheet does not lose too much of its original thickness in extrusion lamination operations (low residual strain), and also sufficiently maintains its initial delamination strength, as well as its tensile strength in z-direction, i.e. z-strength (z-directional tensile strength).

The foam-formed cellulosic fibre-material according to the present invention is thermally stable above 300° C. and has a low heat transfer, as opposed to foamed polymer layers in general. It has been observed that at relatively low densities of from 200 to 450 kg/m$^3$, a foam-formed cellulosic fibre-material sheet does not lose too much of its original thickness in extrusion lamination operations (low residual strain), and also sufficiently maintains its initial delamination strength, as well as its tensile strength in z-direction, i.e. z-strength (z-directional tensile strength).

The foam-formed cellulosic fibre-material may have a grammage of at least 20 g/m$^2$. In some embodiments the grammage is between 20 and 440 g/m$^2$.

According to one embodiment, the foam-formed cellulosic fibre-material has a delamination strength of at least 100 J/m$^2$, preferably at least 140 J/m$^2$ and even more preferred at least 170 J/m$^2$. The delamination strength may be 60-300 J/m$^2$, such as 60-250 J/m$^2$, such as 80-220 J/m$^2$, such as 140-220 J/m$^2$, such as 170-220 J/m$^2$. These values are comparable to the values for conventional materials used in e.g. packaging materials.

According to another embodiment, the foam-formed cellulosic fibre-material has a density of at most 450 kg/m$^3$. Preferably, the density is 250-350 kg/m$^3$, such as 300 kg/m$^3$, such as 200 kg/m$^3$.

The following terms and definitions used herein are to be given the definition herein below.

A "foamed cellulose material" or a "foam-formed material of cellulose fibres" is a material that provides volume or thickness to an article from the material, without necessarily adding a lot of weight, i.e. by having a higher bulk property than conventional fibrous papers or paperboards, the bulk property being the inverse of the material's density. In other words, foamed cellulose is a fibrous material, with tunable density, that can be manufactured by a foam forming process.

Fibre coarseness is defined as weight per fibre length and is normally expressed in units of mg/m or g/m. Coarseness depends on fibre diameter, cell wall thickness, cell wall density and fibre cross section. The coarseness value has a great influence on the paper structure. A high coarseness value indicates a thick fibre wall, giving stiff fibres unable to collapse. Thin walled fibres with low coarseness value give flexible fibres and a denser sheet. The coarser the fibres, the stronger and stiffer they will be. Coarser fibres make bulky paper. This is important for packaging paper and less important for printing paper. Coarse fibre will, however, cause an uneven paper surface.

A "bulk layer" or a "core layer" is a layer that contributes largely to the mechanical rigidity and strength properties and dimensional stability properties, of a laminated material. This is normally the thickest layer of a sandwich material, without necessarily being the strongest or densest material. In a stiff sandwich material, there is often a "bulky" distancing or spacer layer in the center, between two flange layers, i.e. facing layers, which contribute to the total stiffness of the construction by their Young's modulus and/or higher tensile stiffness properties.

"Delamination" is when a material separates into different layers. Delamination is a mode of failure for fibrous materials like paperboard where fibre layers and fibres separate leading to significant loss of mechanical properties.

The "delamination strength" can be characterised by the internal bond strength of the material and can be determined by for example the Huygen Internal Bonding Energy testing device which follows TAPPI T569 and provides a value of J/m$^2$. Paper materials are subjected to out-of-plane loading in many converting operations, such as in printing, creasing, lamination, splicing and folding, which may result in delamination. The "internal bond strength", measured by a Scott Bond type test, may correlate with the "delamination resistance" of the paper material in such converting operations.

"Internal bond strength" (J/m$^2$) is defined as the energy per unit in-plane area required to delaminate a paper material in the through-thickness direction, i.e. z-direction, in a Scott Bond type test.

"Compression strength" of board is the maximum compressive force per unit width that a test piece can withstand until the onset of failure. It is expressed in kilonewtons per metre (kN/m). Measurement standard ISO 9895:2008.

"Canadian Standard Freeness" ("CSF" or "freeness") of pulp is designed to give a measure of the rate at which a dilute suspension of pulp (3 g of pulp in 1 L of water) may be drained (standard ISO 5267-2:2001).

"Compression strength ratio" MD/CD is determined as the ratio of machine directional (MD) compression strength to cross directional (CD) compression strength, which are both measured according to standard ISO 9895:2008

"Z-strength" is thickness directional tensile strength, measurement standard ISO 15754.

The Schopper-Riegler test (see ISO 5267) is designed to provide a measure of the rate at which a dilute suspension of pulp may be dewatered. It has been shown that the drainability is related to the surface conditions and swelling of the fibres, and constitutes a useful index of the amount of mechanical treatment to which the pulp has been subjected.

"Grammage" is expressed as weight per unit in-plane area of paper materials and is measured in g/m$^2$.

The "ply grammage" of a layer in a laminated packaging material is the weight per unit area in g/m$^2$ of that layer.

"Thickness" is the distance between two flat surfaces, which are placed on each side of a paper material and subjected to a pressure of 100 kPa. It is expressed in micrometers (μm).

"Low density" in connection with a cellulose material or bulk material for a laminated packaging material for liquid packaging, means a density which is lower than that of normal paperboard or carton for that purpose, i.e. ultimately lower than 900 kg/m$^3$, such as lower than 700 kg/m$^3$, such as from 100 to 600 kg/m$^3$, such as from 100 to 500 kg/m$^3$, such as from 200 to 500 kg/m$^3$, such as lower than 450 kg/m$^3$.

A "polyolefin" or "polyalkene" is a polymer produced from a simple olefin of the formula $C_2H_{2n}$ as a monomer.

A "polyethylene" is a polyolefin produced by polymerizing the monomer ethylene.

A "copolymer" or "heteropolymer" is a polymer of two or more monomeric species.

A "high density polyethylene" or "HDPE" is an ethylene polymer having a density of more than 0.941 g/cm$^3$.

A "low density polyethylene" or "LDPE" is a polyethylene homopolymer having a density from 0.910 to 0.935 g/cm³. LDPE is also known as branched or heterogeneously branched polyethylene because of the relatively large number of long chain branches extending from the main polymer backbone. LDPE has been commercially manufactured since the 1930s and is well known in the art.

A "linear low density polyethylene" or "LLDPE" refer to a polyethylene copolymer having a density from 0.89 g/cm³. LLDPE is linear and does not substantially contain long chain branching, and generally has a narrower molecular weight distribution than conventional LDPE. The traditional "linear low density polyethylene" (LLDPE) can be produced with conventional Ziegler-Natta catalysts. LLDPE has also been commercially manufactured for a long time (since the 1950s by solution reactors, and since the 1980s by gas phase reactors) and is also well known in the art.

An "mLLDPE" is a linear low density polyethylenes produced by metallocene catalysts in gas phase reactors and/or with metallocene catalysts in slurry reactors and/or with any of the haftocene catalysts in solution reactors. The mLLDPE polymers are well known in the art of packaging technology.

A "blank" means a pre-manufactured, flat un-folded tubular sheet of a packaging material. An example of a packaging material of a blank comprises bulk layer and liquid tight plastic coatings on each side of the bulk layer. The blank is used to manufacture sealed packaging containers by erecting the blank to an open tubular sleeve which is transversally sealed in one end before filling and transversally sealing the open end.

A "thickness" referring to the packaging material, a packaging container, or layers thereof, is unless otherwise defined determined by microscopy, for example by a suitable microscope such as those marketed under the name Olympus, for example BX51.

"Liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

"Aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

Methods

Grammage (in g/m²) was determined using a version of ISO 536 having less samples and smaller samples size. Circular test pieces with an in-plane area of 100±1 cm² were produced using a cutting device (disc cutter or punch). Five circular test pieces were each weighed on a balance reading to an accuracy of ±0.5%. The grammage of each test piece was calculated by dividing the mass of the test piece by the in-plane area.

Thickness (the distance (in μm) between the two flat surfaces, which are placed on each side of the paper material and subjected to a pressure of 100 kPa) was determined using a version of ISO 534 wherein fewer samples were analysed, but several spots per sample were measured. Circular test pieces with an in-plane area of 100±1 cm² were produced using a cutting device (disc cutter or punch). Five test pieces were produced for each sample. For each test piece, the thickness was measured as dead-weight micrometer in accordance with ISO 534 in three different spots and the test piece thickness was evaluated as the average value of these three measurements.

Tensile properties were determined using a version of ISO 1924:3. Test piece of a given dimension, 15 mm wide and long enough (150 mm) were strained to break at a constant rate of elongation (100 mm/min) using a testing machine that automatically records both the tensile force and the elongation. Tests were done in machine direction (MD) and cross direction (CD) separately. 10 test pieces were used for each sample in accordance with ISO 1924:3.

Compression strength (short-span compression test (SCT)) was determined using a version of ISO 9895 wherein 10 samples in each directions were tested. A test piece, 15 mm wide and >70 mm long was clamped between two clamps, spaced 0.70 mm apart, which were forced towards each other until a compressive failure occurred. The maximum force was measured and the compression strength was calculated. The paper or board was tested on 10 test pieces in MD and 10 test pieces in CD direction separately.

Delamination resistance (Scott Bond) was determined as follows. A test piece was cut out and mounted between a steel anvil and an L-shaped aluminium bracket using double-sided adhesive tape. A specific pressure was subjected to the metal plates to ensure repeatable bonding and a pendulum was released from an initial horizontal position and allowed to hit the L-shaped bracket when reaching its vertical position, causing the test piece to delaminate. The consumed energy by the delamination process was evaluated by recording the peak excess swing of the pendulum. The internal bond strength was calculated as the recorded energy divided by the in-plane area of the test piece.

Residual z strain (the residual strain in z-direction (thickness direction)) after a specified load on the sample was determined with a Lloyd LR10K loading device. The sample area exposed to loading was 15.2 cm², with a circular radius of 22 mm. The board sample was placed onto the loading table and a maximum pressure of 2 MPa (force 3041 N) was applied on the sample for a period of 1 s. The relative change was calculated with the initial thickness of the sheet (measured with a separate standard device) and the reading of displacement sensor showing the absolute thickness change, i.e. permanent thickness reduction, from the compression. The residual strain was determined as the point where there was no additional clear drop in the loading force. At least five parallel measurements were carried out in separate points. The residual strain measurement can also be made with sequential loadings, reporting the magnitude of thickness change after each loading.

Laminated packaging materials are obtained by various methods for laminating layers together, such as extrusion lamination, wet or dry adhesive lamination, heat-pressure lamination, and may also be including various coating methods. Although the particular lamination technique is not crucial in order to achieve the benefits of aspects and embodiments described herein, extrusion lamination is one example which may suitably be used to produce laminated packaging materials, in particular carton-based packages used for food such as liquid and semi-liquid food.

According to aspects and embodiments disclosed herein, a packaging container having a long shelf-life is provided, the shelf-life is not less than 3, 6, 8, 9, 10, 11, 12, 13, 14, 15 months. Naturally a long shelf-life is preferred. Generally a shelf-life of at least 12 months is required, which however may vary upon different preferences. In one aspect a packaging container made from the packaging material described herein has a shelf-life of 12 months.

In particular, such a laminated packaging material comprises a bulk layer, comprising a material from a foam-formed fibrous cellulose, also called foamed cellulose. Foamed cellulose is accordingly a fibrous material, with tunable density, that can be manufactured by a foam forming process. The bulk material layer is arranged to provide for the most efficient contribution to the flexural rigidity of a laminate.

The foam-formed fibrous cellulose in accordance with the present invention is based on cellulose fibres, comprising modified cellulose, which is modified to contain dialcohol cellulose functionality. Such dialcohol cellulose functional fibres are obtained by subjecting conventional, unmodified, cellulose fibres from any of the above mentioned types of cellulose pulp or cellulose fibre suspension, to a selective oxidizing treatment of available C2-C3 bonds in the cellulose, thus partly forming dialdehyde cellulose, and subsequently reducing the dialdehyde cellulose to form dialcohol cellulose. The degree of conversion to dialdehyde cellulose may vary from 10 to 50%, such as from 13 to 49%, such as from 20 to 45%, based on the initial number of available C2-C3 bonds in the cellulose. The modified dialcohol cellulose thus comprises both unmodified" cellulose and dialcohol cellulose. The modified cellulose, containing dialcohol cellulose, may be added to an unmodified cellulose fibre composition or fibrous foam composition such that the final content of dialcohol cellulose, based on the total number of C2-C3 bonds in the final fibrous foam cellulose mixture, is approximately from 0.5 to 25%, such as from 0.5 to 20%, such as from 0.5 to 10%, such as from 0.5 to 5%.

A suitable bulk layer for aspects and embodiments disclosed herein thus comprises mainly or only the foam-formed low density cellulose material, and accordingly has approximately, or exactly the same physical properties as the foam-formed fibrous cellulose material of the invention.

According to a further embodiment, however, the bulk layer may further comprise an additional, integrated, flange or facing layer of a cellulose-based material, such as a thin paper, having higher tensile stiffness and a higher density, in order to provide sandwich constructional features within the bulk layer itself. The layer of foam-formed material is then laminated or arranged to be in contiguous layer contact with at least one facing paper layer, within the bulk layer.

The final laminated packaging material may comprise a bulk layer of the foam-formed cellulose and at least one additional, different cellulose material layer, such as a thin paper or a downgauged paperboard facing layer, the layers being laminated by subsequent lamination operations in the manufacturing of the laminated packaging material.

A multilayered bulk layer may thus be a laminate of individual layers produced independently and subsequently glued to each other. Alternatively, a multilayered bulk may be formed already in the paper manufacturing machine. For example, a layer of foam-formed cellulose can be formed by one headbox, while another paper layer, or layer from different cellulose fibers, is formed by another headbox in the same machine. The use of multiple headboxes in the same paper machine is wellknown in the field of paper making. It is also possible to use a stratified head box to form the layers of a multilayered product.

In a different embodiment of the invention, the foam-formed cellulose fibre material may be distributed into a mould and subsequently dewatered and dried to obtain a final three-dimensional shape. By the improved internal bond strength, i.e. delamination strength, it is thus possible to produce a three-dimensional article by moulding the aqueous fibrous foam composition without the addition of large amounts of further additives or polymers, for the purpose of internal bonding strength.

The bulk layer or the foam-formed cellulose material used herein has a surface weight grammage of at least 20 $g/m^2$. In some embodiments the grammage is between 20-440 $g/m^2$. The grammage is for example dependent on the requirements conferred by different types of packages. The grammage of the bulk layer is assessed in accordance with ISO 536. Surface weight grammage expresses weight per unit area and is measured in $g/m^2$. The bulk layer normally has a thickness between 80-1100 μm, and is appropriately selected in order to obtain the desired stiffness suitable for the type of packaging container and the intended food product. The bulk layer thickness can be assessed by microscopy or by a ply grammage method, as discussed herein below. The ply grammage of a layer in a laminated packaging material is the weight per unit area in $g/m^2$ of that layer. The grammage of a bulk layer in a laminated packaging material is calculated as the difference between the total grammage and the ply grammages of the polymer and aluminium foil layers.

The foam-formed cellulose provides at least 20%, such as at least 25% such as at least 30%, such as at least 40% of the thickness of the bulk layer. The percentages may be determined by examining the cross-section of the packaging material in a microscope.

The bulk layer may according to some aspects and embodiments be surface-treated or surface-coated in order to improve adhesion and compatibility between surrounding layers of the packaging laminate, and/or to obtain additional desired properties such as improved stiffness. Such surface treatment may be provided by means of exposure of the material surface to corona, ozone or flame treatments, or the like.

The bulk layer has for example a thickness from 80 to 1100 μm, such as from 90 to 800 μm, such as from 150 to 600 μm, such as from 200 to-550 μm, such as from 250 to 350 μm. Expressed as surface weight, $g/m^2$, a corresponding suitable range is from 20 to 440 $g/m^2$, such as from 25 to-350 $g/m^2$, such as from 45 to 250 $g/m^2$, such as from 60 to 220 $g/m^2$, such as from 60 to 200 $g/m^2$.

The foam-formed cellulose of the present invention has further improved internal bond strength, i.e. delamination strength, as compared to the corresponding foam-formed cellulose not comprising modified pulp with dialcohol cellulose in its composition. In addition, it has also improved mechanical properties such as tensile strain, tensile and compression strength.

Without being bound to a certain theory, it is believed that the dialcohol cellulose fibres are more amorphous in nature and more molecularly mobile than conventional, unmodified, cellulose fibres, and are located as shells surrounding a more crystalline core of unmodified cellulose fibres. This morphology of the cellulose mixture is believed to facilitate plastic deformation both within and between individual fibres, at deformations beyond the yield point. Such a configuration of a stiff core and soft shell in the cellulose, seems advantageous to create a larger bonded area and to obtain higher strength and ability to absorb energy upon deformation.

A plausible reason for the much improved properties of a foam-formed cellulose that contains the rather low amounts of the dialcohol cellulose, can be that it is possible to retain most or all of the modified fibres in the composition, as they have the same dimension as the other pulp fibres present in the composition, thus making the most of its positive effects on the cellulose composition as a whole.

The bulk layer, which includes a foam-formed cellulose layer and optionally an additional cellulose layer, may be provided with coatings such as for example clay coating, or may be surface modified. Such coatings or surface modifications may also be suitable for application to an additional layer, which is for example intended for printing, and arranged between the bulk layer (optionally including an additional cellulose layer) and the outermost heat sealable polymer layer. The bulk layer, optionally including an additional layer, such as a thin paper facing layer, can be surface modified or there may be an adhesive or binding layer in order to facilitate the compatibility and bonding between the bulk layer and additional layers.

The bulk layer comprises foam-formed cellulose as bulk material and is characterized by a density less than 700 $kg/m^3$, such as from 100 to 600 $kg/m^3$, such as from 100 to 500 $kg/m^3$, such as from 200 to 500 $kg/m^3$, such as from 200 to 400 $kg/m^3$, such as from 300 to 500 $kg/m^3$, such as from 300 to 400 $kg/m^3$, such as from 200 to 300 $kg/m^3$. In some aspects and embodiments the bulk layer is comprised of foam-formed cellulose, thus not really constituting in itself a bulk layer, but rather a spacer layer for a final laminate or sandwich configuration, and the bulk spacer layer has a density less than 700 $kg/m^3$, from 100 to 600 $kg/m^3$, such as from 100 to 500 $kg/m^3$, such as from 200 to 500 $kg/m^3$, such as from 200 to 400 $kg/m^3$, such as from 300 to 500 $kg/m^3$, such as from 300 to 400 $kg/m^3$, such as from 200 to 300 $kg/m^3$. The lower the density of the foam-formed cellulose bulk material, the higher cost-efficiency regarding raw materials consumed, while better resistance to thickness reduction properties of a foam-formed cellulose was obtained at above 300 $kg/m^3$. According to an embodiment, the optimal density of foam-formed cellulose to be used in laminated packaging materials has been concluded to be from 200 to 500 $kg/m^3$, in particular from 200 to 400 $kg/m^3$, such as from 300 to 400 $kg/m^3$. In some embodiments a laminated packaging material comprises a bulk layer comprising the foam-formed cellulose material, as defined above, and at least one thermoplastic material layer laminated thereto. The thermoplastic layer is covering and protecting the cellulose-based bulk layer and may constitute an outer heat-sealable side of the laminated packaging material.

The side of the bulk layer which is to become the outer side of the closed and sealed packaging container may be printed with a décorative ink pattern, and subsequently coated by a thermoplastic, outer, liquid-tight and heat sealable layer.

According to aspects and embodiments disclosed herein the bulk layer thus provides an opportunity to incorporate a foam-formed cellulose, into a laminated packaging material suitable for preparing packaging containers for food products, especially for liquid and semi-liquid food products. Lamination of the bulk layer and the bulk material of foam-formed cellulose to polymer layers may be carried out by melt extrusion operations, like extrusion coating and extrusion lamination of the plastic layers. The extrusion is generally done at high temperatures such as, in the case of low density polyethylenes, up to about 330° C. Such temperatures have been shown not to become a major problem for a bulk layer comprising foam-formed cellulose. This is in contrast to the case of bulk layers of foamed polymer layers. The foam-formed cellulose is fairly thermally stable above 300° C. and has a low heat transfer, as opposed to foamed polymer layers in general. It has been seen that at relatively low densities of from 200 to 400 $kg/m^3$, a foam-formed cellulose sheet does not lose too much of its original thickness in extrusion lamination operations, and maintains also sufficiently its initial delamination strength, as well as its so-called z-strength.

The bulk layer comprising foam-formed cellulose as described in aspects and embodiments herein, provides the desired strength against delamination, i.e. it does not easily delaminate under standard conditions. The delamination strength can be determined by for example the Huygen Internal Bonding Energy testing device which follows TAPPI T569 and provides a value of $J/m^2$ where the packaging material herein is between 60-300 $J/m^2$, such as 60-250 $J/m^2$, such as 80-220 $J/m^2$, such as 140-220 $J/m^2$, such as 170-220 $J/m^2$. In some aspects and embodiments the bulk layer is providing a distance between a barrier layer and an outermost thermoplastic heat sealable polymer layer, and is thereby enabling tailor-made laminated packaging material structures. In some embodiments the bulk layer comprising foam-formed cellulose provides improved delamination strength in combination with compression strength in the thickness direction, which provides sufficient distance between the barrier layer and the outermost thermoplastic layer.

Foam-formed cellulose can be generated by mixing cellulose fibers and a foaming fluid, such as water with a surfactant such as sodium dodecyl sulphate (SDS) (or so-called sodium aluryl sulphate (SLS)). The amount of the surfactant should be from 0.01 to 1000 ppm, such as from 0.01 to 100 ppm, such as from 0.01 to 10 ppm, such as from 0.05 to 10 ppm, such as from 0.1 to 8 ppm. In particular, when using SDS, the amount of foaming agent is from 0.05 to 10 g/l, such as from 0.1 to 8 g/l. A rotor mixer on a general foam-generator generates the foam-formed cellulose. The foam is generally formed by bringing a gas into the mixture. Air is an example of an appropriate gas. Another suitable gas is oxygen. Generally the gas is brought into the mixture by pressurized gas and by the vortex caused by stirring. Generally the cellulose is provided as a liquid dispersion comprising cellulose fibers. An example of liquid is water. Some examples of cellulose fibers are cellulose based fibers such as chemical pulp fibers, chemi-thermomechanical pulp fibers, thermo-mechanical pulp fibers, and Kraft pulp fibers. The fibre dispersion may for example be added to the foaming fluid after a foam has been generated by the fluid (including the surfactant). Optionally, the liquid dispersion comprising cellulose fibers may be combined with the foaming fluid prior to foaming. An additive, for controlling the consistency of the foam may be added, if necessary. The amount of fibres in the fibrous foam composition is from 0.1 to 10 weight-%, such as from 0.1 to 7 wt %, such as from 0.1 to 5, such as from 0.5 to 5, such as from 0.5 to 4, such as from 0.5 to 3 wt %, based on the total wet foam composition.

The foam-formed cellulose generated as described herein is run through a nozzle arrangement ("headbox") where pressure and forming tools generate a web of foam-formed cellulose which is rolled onto a reel, after at least partly drying it, and storing it, before future use to prepare for example a packaging material. Optionally the foam-formed cellulose web can be used in-line, i.e. directly applying additional layers in order to transform the foam-formed cellulose web to a laminated packaging material for liquid or semi-liquid food packaging. Compared to traditional paper manufacturing, additional or modified drying may suitably be used in order to achieve the desired dryness and density.

In some embodiments the foam-formed cellulose of the invention may be further mixed with additive amounts (such as below 10 wt-%) of other materials, such as strength chemicals or agents, such as starch and derivatives thereof, or carboxymethyl cellulose and derivatives thereof. Starch may for example be added at less than 6 wt % of the cellulose composition, preferably at from 0.5 to 5.5 weight-%, such as from 2 to 5 weight-%.

Furthermore, sizing agents, such as alkyl succinic anhydride (ASA), alkyl ketene dimer (AKD) and rosin, may be added to the cellulose composition at amounts up to 4 kg/tonne. In the production of liquid packaging board, the internal sizing is usually done by adding AKD (Alkylketene dimer).

There is no need for further addition of polymers to the foam-formed fibre composition of the present invention, in order to enable using of the obtained foam-formed cellulose material for bulk materials in liquid carton packaging materials and laminates.

In some embodiments the laminated packaging material comprises an additional layer between the outermost thermoplastic layer and the bulk layer. The additional layer can for example be a paper or paperboard layer or a polymer film. The additional layer may contain a print on the side which is to become the outside of the packaging container. Whenever the additional layer is a paper, paperboard or cellulose layer, a grammage of at least 20 g/m$^2$ and in some embodiments between 20 and 100 g/m$^2$ are suitable. The paper layer may be coated with a white coating or clay coating layer to improve the whiteness of the surface. Whenever the additional layer is a polymer film its thickness should be between 10-50 µm. Example of suitable films are oriented pre-manufactured films such as BOPP (biaxially oriented polypropylene), BoPET (biaxially oriented polyethylene terephthalate), polyamide, and oriented high density polyethylene films.

The additional layer may be selected from a paper layer having a grammage of between 20 and 100 g/m$^2$ and a polymer film having a thickness of 10-50 µm.

According to aspects and embodiments disclosed herein the laminated packaging material comprises a bulk layer having a density of less than 700 kg/m$^3$ and comprising foam-formed cellulose of the present invention, said packaging material further comprises an additional layer arranged by help of a binding layer, such as for example a thermoplastic polymer binding layer, such as a polyolefin-based polymer or copolymer binding layer, wherein the binding layer is arranged between the bulk layer and the additional layer, and said additional layer on the side opposite the binding layer has a decorative printed pattern arranged, said bulk layer, on the side opposite the binding layer is provided with a barrier layer, which on the side opposite from the bulk layer is provided with a heat-sealable layer. The outermost layer covering the printed decorative pattern is a polyolefin layer, such as an outermost heat-sealable polyolefin layer to be in contact with the surroundings of a packaging container, for example LDPE or polypropylene. The outermost thermoplastic layer provides additional protection, e.g. moisture resistance and scratch/wear resistance, and stability to the packaging container.

The thickness of outer layer of the packaging material, directed towards the outside of a package made from the material, is for example between 5 µm -50 µm such as 7 µm-30 µm, such as 7 µm-20 µm, such as 8 µm-15 µm.

Since the outermost thermoplastic layer is covering the decorative print pattern, it needs to be transparent such that the printed decor is well visible to the outside of the package without being deteriorated by the plastic layer quality.

On the side of the bulk layer opposite the printed decor and hence facing the inside of the final packaging container, a barrier layer is arranged, for example by means of an intermediate laminate layer which could be a polyolefin-based layer of for example HDPE, LDPE, polypropylene, or another suitable thermoplastic polymer layer such as ethylene-acrylic acid copolymer (EAA), which further facilitates adhesion between the bulk layer and the oxygen barrier. Optionally the bulk layer and/or the barrier layer can be treated or modified in order to achieve adhesion between the layers, in which case the laminate layer may not be needed. For example a coating which modifies the surface of one or more of the substrates may be used. In some embodiments the barrier layer is an aluminium foil, a barrier film or coating. When an aluminium foil is used a suitable thickness is between 3-15 µm, such as 5-10 µm, such as 5-8 µm. The laminate layer is in an embodiment applied by an extrusion process using commercially available extrusion equipment. Materials, suitable as laminate layer, are known and conventionally comprise a polyolefin. According to one embodiment the laminating material comprises a polyethylene or blends thereof. Within the group of polyethylenes, the properties of laminating layers can be varied and tailored in order to achieve various final properties in a packaging material. Variations of the laminate layer for the desired type of packaging material for liquid and semi-liquid foods are thus found largely within the group of polyethylene polymers.

The thickness of the laminate layer of the packaging material is for example between 5 µm-50 µm such as 10 µm-30 µm, such as 15 µm-30 µm, such as 17 µm-25 µm.

The barrier layer, such as oxygen barrier layer (e.g. aluminium foil or a polymer film such as a vapour deposition coated thermoplastic film) is arranged by help of the laminate layer on the side opposite the bulk layer. Optionally the bulk layer and/or the barrier layer can be treated or modified in order to achieve adhesion between the layers, in which case the laminate layer is not needed. For example a coating which modifies the surface of one or more of the substrates may be used. In some embodiment the barrier layer has an adhesive on the side opposite the optional laminate layer. The adhesive is within the capacity of those skilled in the art to select depending on desired properties and compatibility with the layer to which it is in contact. When the barrier layer is aluminium foil an example of adhesive is ethylene copolymers with comonomers having carboxylic acid functionality such as ethylene acrylic acid copolymer, for example marketed under the tradename Primacor® by Dow or Nucrel® by Dupont.

The packaging material further contains an innermost heat-sealable layer. An example of a heat-sealable layer is a heat-sealable polyolefin polymer which is applied as a layer to be directed towards the inside of the container, i.e. in direct food contact. The heat-sealable layer for the innermost layer may suitably be a polyethylene polymer of the low density type, selected from the group consisting of LDPE, LLDPE, VLDPE, ULDPE or mLLDPE and blends of two or more thereof. The arrangement of the heat-sealable layer is similar to the laminate layer and what was disclosed above in connection with the laminate layer applies also for the heat-sealable innermost layer. Depending on the type of packaging containers produced from the packaging material, also heat-sealable innermost layers of high density polyethylene, polypropylene or propylene co- or ter-polymers are conceivable within the scope of the appending claims as long as they are compatible with and achieve the desired effect in combination with other components of the packaging material and in particular the adhesive as described herein. Suitable examples to be used as innermost layers are blends between LDPE and mLLDPE (e.g. 50/50, 40/60, 60/40, 30/70, 70/30, 20/80, 80/20 weight % blend ratios), such as LDPE of extrusion grade. The thickness of the innermost layer of the packaging material is for example between 5 µm-50 µm, such as 10 µm-30 µm, such as 15 µm-30 µm, such as 17 µm-25 µm.

Generally the different layers present in the packaging material are possible to detect, for example by microscopy. It may not be possible to separate one or more of the layers, for example the adhesive from the heat-sealable layer, and thus in certain embodiments the layer forming the inside of the packaging container is a combination of the adhesive and the heat-sealable layer where the heat-sealable layer is facing the liquid or semi-liquid food product. The adhesive layer of the packaging material as described herein has a thickness between 3 µm-12 µm, such as 4 µm-10 µm such as 5 µm-9 µm. The adhesive layer may be characterized by different methods including for example infrared spectroscopy (IR).

Naturally, the above referred examples are working as a general guidance and also other polymers are possible in the outer- and innermost and lamination layers.

Hence the above mentioned layers of the packaging material are for example and conventionally applied to the respective side of the bulk material by extrusion coating and extrusion lamination techniques.

In particular, a laminated packaging material according to the invention comprises a bulk layer, comprising a material from a foam-formed cellulosic fibre-material, also called foamed cellulose. The bulk material layer can be arranged to provide for the most efficient contribution to the flexural rigidity of a laminate. The bulk layer may thus be appropriately selected in order to obtain the desired stiffness suitable for the type of packaging container and the intended food product.

A bulk layer comprising foam-formed cellulosic fibre-material according to the present invention provides necessary delamination strength in combination with compression strength in the thickness direction, which provides sufficient distance between a barrier layer and an outermost thermoplastic layer of the packaging material.

A suitable bulk may thus comprise mainly or only the foam-formed cellulosic fibre-material, and accordingly has approximately, or exactly the same physical properties as the foam-formed cellulosic fibre-material according to the invention.

The bulk layer may further comprise an additional, integrated, flange or facing layer of a cellulose-based material, such as a thin paper, having higher tensile stiffness and a higher density, in order to provide sandwich constructional features within the bulk layer itself.

Thus, the layer of foam-formed cellulosic fibre-material may be laminated or arranged to be in contiguous layer contact with at least one facing paper layer, within the bulk layer.

The final laminated packaging material may comprise a bulk layer of the foam-formed cellulosic fibre-material and at least one additional, different cellulose material layer, such as a thin paper or a downgauged paperboard facing layer, the layers being laminated by subsequent lamination operations in the manufacturing of the laminated packaging material.

A multilayered bulk layer may be a laminate of individual layers produced independently and subsequently attached to each other.

Alternatively, a multilayered bulk may be formed already in the paper manufacturing machine. For example, a layer of foam-formed cellulosic fibre-material can be formed by one headbox (a nozzle arrangement), while another paper layer, or layer from different cellulose fibres, may be formed by another headbox in the same machine. The use of multiple headboxes in the same paper machine is well known in the field of paper making. It is also possible to use a stratified head box to form the layers of a multilayered product.

The packaging material may comprise an additional layer between the bulk layer and the outermost heat-sealable décor-covering layer.

This additional layer may have a surface weight grammage of at least 20 g/m$^2$.

The additional layer may be a paper layer or a polymer layer or polymer film.

The additional layer may be surface coated or surface modified in order to increase adhesion to the adjacent layers.

If necessary, for example in order to achieve an improved adhesion between the additional layer and the bulk layer, a binding layer may be present.

The binding layer may be selected from materials listed under the description of the laminate layer.

The packaging material may be transformed into a packaging container. The packaging container may be an aseptic packaging container. The packaging container may be a packaging container for liquid or semi-liquid food.

A packaging container formed from the packaging material according to the invention may be of any known shape.

The container may be a substantially brick- or wedge-shaped container that is durable when exposed to handling and distribution and resistant to moisture and oxygen gas during long term storage, due to the high quality packaging material, which in turn also provides for sufficient seal quality and gas barrier properties.

Some embodiments thus relate to a packaging material comprising an outermost heat-sealable, décor-covering layer which on one side of the layer has a bulk layer having a density of less than 700 kg/m$^3$ and comprises foam-formed cellulose of the present invention, which on the side opposite the outermost heat-sealable décor-covering layer has a barrier layer, which on the side opposite the bulk layer has a thermoplastic heat-sealable layer. In some embodiments the barrier layer is laminated to the bulk layer by a laminate bonding layer. The materials of the layers are selected from the layers described hereinabove. In some embodiments the packaging material is used to produce packaging containers for liquid or semi-liquid food. In some embodiments the packaging material comprises an additional layer between the bulk layer and the outermost heat-sealable décor-covering layer. In some embodiments the additional layer has a surface weight grammage of at least 20 g/m$^2$. If necessary, for example in order to achieve an improved adhesion between the additional layer and the bulk layer a binding layer is present. In some embodiments the binding layer is selected from materials listed under the description of the laminate layer. In some embodiments the additional layer is a paper layer or a polymer layer or film. In some embodiments the additional layer may be surface coated or surface modified in order to increase adhesion to the adjacent layers.

According to one possible production method the packaging container is obtained by providing a bulk layer having an optional print, and a suitable crease pattern, the bulk layer has a cut hole for an opening such that a packaging container will possess at least one hole (or attenuation). The above mentioned crease patterns serves as folding lines for forming the final package such as a Tetra Brik® Aseptic. An example of a crease pattern can for example be seen in FIG. 3 of WO2012/163753. The bulk layer is fed from a roll and the bulk layer web is optionally treated with heat and/or ozone. The laminate layer is arranged, on the side opposite the optional print, by help of a film of plastic exiting an extruder. Normally the extruded material has a temperature above 260° C., such as above 280° C., such as above 290° C., such as above 300° C. In order to further describe extrusion lamination, an extruder melts and mixes the polymer to be extruded. In case of blends the extruder may also be used to blend the polymers which are for example supplied via separate hoppers. The molten film, which joins two webs or which is coated onto a moving web, is extruded through a die, whereafter the extruded film and the web(s) are joined in a nip between two lamination rollers while cooling and solidifying. For example, a web of the bulk layer and a web of barrier layer may be joined by a molten polymer film, extruded as a continuous curtain of even thickness of polymer, into the nip between the lamination rollers. The outer and inner polymer layers may be extrusion coated as similar molten polymer film curtains, extruded into a cooled roller nip in order to solidify as a polymer coating onto the substrate web or e.g. bulk or barrier material.

In one embodiment the packaging material described herein, and in the accompanying claims provides a packaging material which comprises an outermost thermoplastic, heat sealable décor-covering layer (11) which on one side of the layer has an additional layer (27), said additional layer has on the side opposite the outermost, thermoplastic décor-covering layer a binding layer in order to arrange a bulk layer, said bulk layer (12), on the side opposite the décor-covering layer (11) has a laminate layer (13), said laminate layer (13), on the side opposite the bulk layer (12) has an oxygen barrier (14), said oxygen barrier (14), on the side opposite the laminate layer (13) has an adhesive (15), and said adhesive (15), on the side opposite the oxygen barrier (14) has a heat-sealable layer (16). The packaging material is in one embodiment transformed into an aseptic packaging container. The transformation may be performed by pre-folding and sealing parts of the packaging material into a blank. Example of packages made from blanks are for example Tetra Recart® and gable top containers. The blank may be provided with an opening device and filled and sealed in a filling machine suitable to handle blanks. The transformation from a packaging material into a packaging container may also be performed using the continuous tubular-web form-fill-seal technology, for example in a Tetra Pak® A3 Speed/Flex. A packaging container formed from the packaging material according to the aspects and embodiments described herein may be of any known shape. In some aspects the container described herein relates to a substantially brick- or wedge-shaped container that is durable at handling and distribution and resistant to moisture and oxygen gas during long term storage, due to the high quality packaging material, which in turn also provides for sufficient seal quality and gas barrier properties. Further types of paperboard-based packages for liquid packaging where the aspects and embodiments described herein may be useful is a brick shaped packaging container, a gable top packaging container, a wedged-shape packaging container, a square-, rectangular- or octagonal-based packaging container. More specifically the so called, Tetra Brik®, Tetra Brik® Aseptic, Tetra Brik® Edge, Tetra Gemina® Aseptic, Tetra Prisma® Aseptic, Tetra Rex®, and Tetra Top® and Tetra Evero® packages or other kinds of bottle-like packages comprising a sleeve of the paperboard-based packaging material. One embodiment described herein relates to a Tetra Brik® packages of a known size such as 200 ml, 250 ml, 500 ml, and 1000 ml which optionally may have a squared base, or a slanted top such as for example Tetra Brik® Edge.

It has been generally concluded that the amount of cellulose fibres may be reduced significantly in the laminated packaging material of the invention, while it nevertheless has maintained mechanical properties and suitability for food packaging in general, and for liquid carton packaging in particular. Additionally, detailed descriptions of embodiments are disclosed in connection with the description of embodiments.

DESCRIPTION OF THE DRAWINGS

Further advantages and favorable characterizing features will be apparent from the following detailed description, with reference to the appended figures, in which:

FIGS. 2a and 2b are cross-sectional views of laminated packaging materials according to aspects described herein.

FIG. 18 shows a flowchart illustrating one embodiment of the method according to the invention.

GENERAL DESCRIPTION OF EMBODIMENTS

Figure 1A:
FIGS. 1a and 1b are cross-sectional views of a bulk layer for a laminated packaging material according to aspects described herein.

FIG. 1a schematically shows a cross-section of an example of a bulk layer consisting of the foam-formed cellulose of the invention.

The foam-formed cellulose comprises 1.5 weight % dialcohol cellulose, based on the total cellulose content, and was made according to the following described Examples. It has a density of 301 kg/m$^3$ and the thickness of the bulk layer made from the foam-formed cellulose is 286 μm. The Scott Bond value measured on the foam-formed cellulose material was 178 J/m$^2$.

Figure 1B:

FIG. 1b schematically shows a cross-section of a different example of a bulk layer. The same foam-formed cellulose material as used in FIG. 1a, was according to this example laminated to a further paper, being a Kraft paper having a surface weight of 70 g/m$^2$, the two celllulose materials thus together forming a bulk layer.

FIG. 2a schematically shows a cross-section of an example of a laminated packaging material. The outer, décor-covering layer (21) is a polyolefin such as a suitable LDPE or PP. The outer layer may be used to provide cover of a printed pattern, a hole and/or weakening (not shown in the figure) which is provided in the bulk layer (22), which layer is arranged on one side of the outer layer (21). Between the outer layer (21) and the bulk layer (22) an additional layer (27) of paper or cellulose is arranged. The bulk layer (22), on the side opposite the outer layer, has a laminate layer (23) selected from suitable polyolefins such as LDPE or PP. The laminate layer provides adhesion to the oxygen barrier (24), which is arranged on the opposite side of the laminate layer (23). The barrier layer (24) provides the desired barrier such as oxygen, light, water and vapour barrier depending on the specific need determined by the product to be packed. The barrier layer can for example be an aluminium foil or a vapour deposited film, such as a metallized or vapour deposition coated film, such as a PECVD (plasma enhanced chemical vapour deposition) coated film. On the side opposite the laminate layer an adhesive polymer (25) is arranged on the barrier layer. The adhesive (25) may for example be applied by extrusion coating. When the barrier layer is aluminium foil the adhesive could be a suitable ethylene (meth)acrylic acid copolymer (E(M)AA) adhesive marketed under the tradename Primacor® or Nucrel®. On the side opposite the barrier layer, the adhesive is provided with a heat-sealable layer (26) such as a suitable polyolefin such as PE or PP or blends thereof. The heat-sealable layer is the layer facing the product in the finished packed packaging container.

FIG. 2b schematically shows a cross-section of a second example of a laminated packaging material. The outer layer (21) (to be directed towards the outside of a package made from the material) is a polyolefin such as a suitable LDPE or PP. The outer layer may be used to provide cover for a printed pattern, a hole and/or weakening (not shown in the figure) which is provided in one or more of the other layers of the laminate. On one side of and adjacent the outer layer, a thin paper (27) of a surface weight of about 100 g/m$^2$ or lower is arranged. The thin paper layer (27) is laminated to a bulk layer (22), opposite the outer layer, by an intermediate thermoplastic outer binding layer (28). The binding layer (28) may be selected from suitable polyolefins such as LDPE or PP or blends thereof. The binding layer (28) binds the bulk cellulose layer (22) and the thin paper layer (28) together. The bulk layer (22), is further laminated to a laminate layer (23) of thermoplastic polymer, on the side of the bulk layer opposite the side laminated to the binding layer (28). The laminate layer (23) provides adhesion to an oxygen barrier layer (24), which is arranged on the opposite side of the laminate layer (23). The barrier layer (24) provides the desired barrier such as oxygen, light, water and vapour barrier depending on the specific need determined by the product to be packed. The barrier layer can for example be an aluminium foil or a vapour deposited film, such as a metallized or vapour deposition coated film, such as a PECVD coated film. On the side opposite the laminate layer an adhesive polymer (25) is arranged on the barrier layer. The adhesive (25) may for example be applied by extrusion coating. When the barrier layer is aluminium foil the adhesive could be a suitable ethylene (meth)acrylic acid copolymer (E(M)AA) adhesive marketed under the tradename Primacor® or Nucrel®. On the side opposite the barrier layer, the adhesive is provided with a heat-sealable layer (26) such as a suitable polyolefin such as PE or PP or blends thereof. The heat-sealable layer is the layer facing the product in the finished packed packaging container.

A packaging material according to the present invention may be a laminate packaging material which comprises an outermost thermoplastic, heat sealable décor-covering layer which on one side of the layer has a bulk layer comprising the foam-formed cellulosic fibre-material of the invention, which bulk layer on the side opposite the décor-covering layer has a laminate layer, said laminate layer, on the side opposite the bulk layer has an oxygen barrier, and said oxygen barrier, on the side opposite the laminate layer has a heat-sealable layer.

Furthermore, a laminated packaging material may comprise a bulk layer having a density of less than 700 kg/m$^3$ and comprising foam-formed cellulosic fibre-material according to the present invention. The packaging material further comprises an additional layer arranged by means of a binding layer, such as for example a thermoplastic polymer binding layer, such as a polyolefin-based polymer or copolymer binding layer, wherein the binding layer is arranged between the bulk layer and the additional layer. The additional layer has a decorative printed pattern arranged on the side opposite the binding layer. The bulk layer is provided with a barrier layer on the side opposite the binding layer. A barrier layer may be provided with a heat-sealable layer on the side opposite from the bulk layer. The outermost layer covering the printed decorative pattern is a polyolefin layer, such as an outermost heat-sealable polyolefin layer to be in contact with the surroundings of a packaging container, for example low density polyethylene (LDPE) or polypropylene. The outermost thermoplastic layer provides additional protection, e.g. moisture resistance and scratch/wear resistance, and stability to the packaging container.

Figure 3:
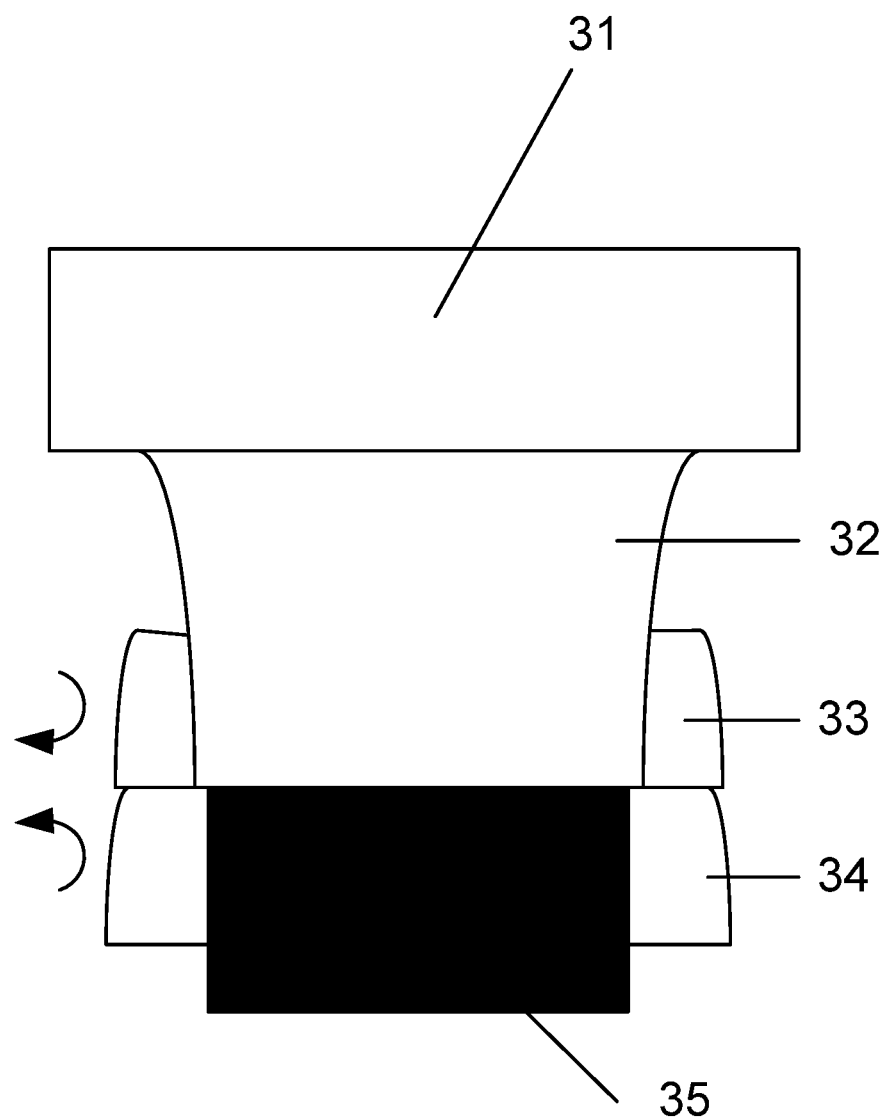
FIG. 3 is a schematic drawing of an extruder, the extruded film, a paper or packaging material web and the rollers arrange to join the plastic and the bulk layer.

FIG. 3 is a schematic illustration of an extruder (31). An extruder of the schematic illustration is suitable for application of the, outer layer (11), laminate layer (13), adhesive (15) and the heat-sealable layer (16). As an example the laminate layer (13) can be applied on the bulk layer (12), whereby the drawing shows a molten plastic film (32) of the polymer to become the laminate layer (13) being arranged by melt extrusion coating onto a bulk layer web (35). The extruder melts and mixes the polymer(s). In case of the layers being polymer blends, the extruder may also be used to blend the polymers which are for example supplied via separate hoppers for the polymer granules. The molten film (32) and the bulk layer are joined in a lamination nip between rollers (33 and 34) which exert a pressure. One of the rollers can be a chilled roller which reduces the temperature of the polymer when in the nip. Similarly the other polymers of the packaging material may be added to the bulk layer (35). The barrier layer (14) may for example be forwarded from a separate roll and fed through the lamination nip together with the laminate layer (13), or with an adhesive.

Figure 4:
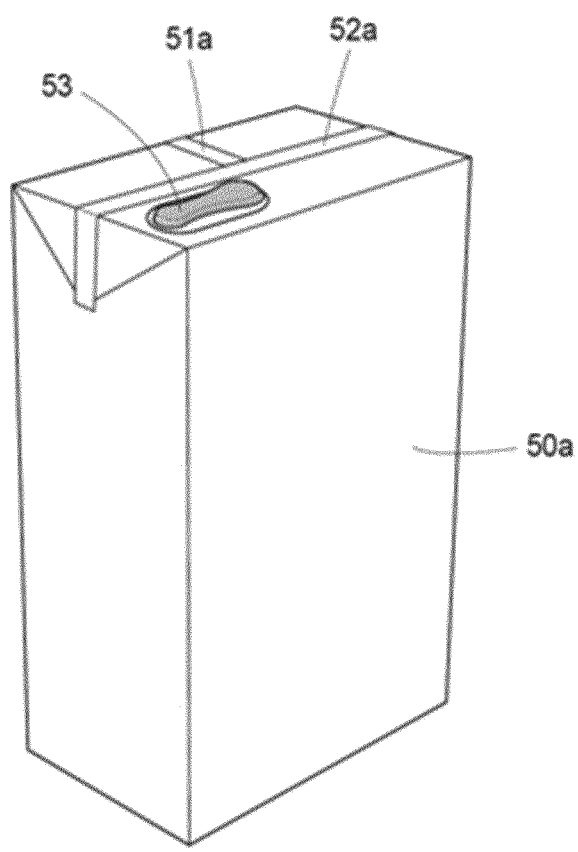
FIG. 4 shows an example of a packaging container produced from the packaging material according to embodiments described herein.

FIG. 4 shows an example of a packaging container 50a produced from the packaging material described in FIG. 1 or 2. The packaging container is particularly suitable for liquid or semi-liquid food products such as beverages, sauces, soups or the like. Typically, such a package has a volume of from about 100 to about 2000 ml. It may be of any configuration such as those previously described herein, but is for example brick-shaped, having longitudinal and transversal seals 51a and 52a, respectively, and optionally an opening device 53. In another embodiment, not shown, the packaging container may be shaped as a wedge. In order to obtain such a "wedge-shape", only the bottom part of the package is fold formed such that the transversal heat-seal of the bottom is hidden under the triangular corner flaps, which are folded and sealed against the bottom of the package. The top section transversal seal is left unfolded. In this way the half-folded packaging container is still easy to handle and dimensionally stable (i.e. substantially maintains form and shape) when put on a shelf in the food store or on a table or the like.

Figure 5:
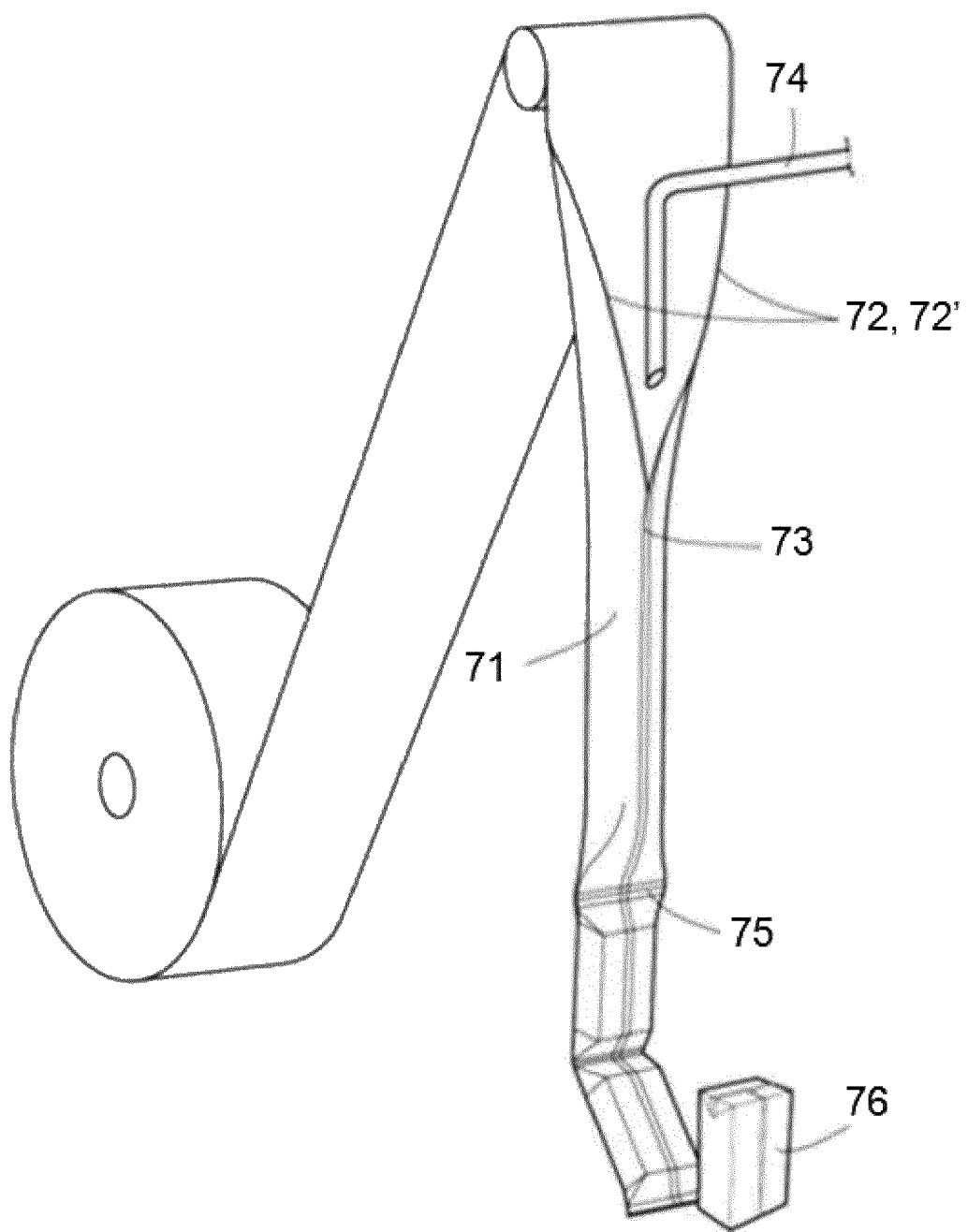
FIG. 5 shows the principle of how such packaging containers are manufactured from the packaging material in a continuous forming, filling and sealing process.

FIG. 5 shows the principle as described in the introduction of the present application, i.e. a web of packaging material is formed into a tube 71 by the longitudinal edges 72, 72' of the web being united to one another in an overlap heat-sealed joint 73. The tube is filled 74 with the intended liquid food product and is divided into individual packages by repeated transversal seals 75 of the tube at a pre-determined distance from one another below the level of the filled contents in the tube.

The packages 76 are separated by incisions in the transversal seals and are given the desired geometric configuration by fold formation along prepared crease lines in the material.

EXAMPLES

Example 1

Modified cellulose pulp was prepared from unmodified wood cellulose fibre pulp by oxidizing part of the fibres in suspension to dialdehyde cellulose at a degree of conversion of about 30%, based on the initial number of oxidizable C2-C3 bonds, and subsequently reducing the dialdehyde cellulose into dialcohol cellulose. The cellulose fibres have an average diameter of at least 1 μm. The average diameter of the fibres of the present disclosure is normally at least 5 μm, such as at least 8 μm, such as at least 12 μm. The average length of the fibres of the present disclosure is preferably at least 0.3 mm, such as 0.3-4 mm. Any fibre length is however conceivable as long as a foam of the fibres may be created, such as up to 50 mm. The fibres of the present disclosure are preferably of lignocellulosic origin. The degree of conversion of cellulose to dialdehyde cellulose can be determined using the method "carbonyl content determination" described below. The fibre suspension used in the method for preparing the fibres of the material may be a suspension of beaten fibres.

Bleached softwood kraft fibres (K46) were supplied by SCA Forest Products (Östrand pulp mill, Timrå, Sweden). The material was beaten in a Voith mill to an energy input of 160 Wh/kg (about 30°SR). The fibers were partly oxidized to dialdehyde cellulose by adding 2.5 kg of sodium periodate per 39 kg pulp (dry content 4.5%) to a 50 litre reactor with a stirrer. To limit formation of radicals and unwanted side reactions, the reaction was performed in the dark. After 2 hours of stirring and oxidation, the reaction was stopped by filtration and washing of the fibres. The fibres were then suspended in water and 7.5 kg of ice to a total weight of 37 kg. The dialdehyde cellulose formed was further reduced to dialcohol cellulose: 350 gram sodium borohydride was first dissolved in 2.5 litres of deionized water and the solution obtained was subsequently added to the dialcohol cellulose during 3 minutes and then stirred for 1 hour. The reduction reaction was followed by filtration and thorough washing, resulting in 0.69 kg modified pulp.

The carbonyl content was determined by a protocol based on Zhao et al. (Determination of degree of substitution of formyl groups in polyaldehyde dextran by the hydroxylamine hydrochloride method. Pharm. Res. 8:400-402 (1991)). (The fibers were suspended in water and adjusted to pH 4, followed by dewatering to a gel-like consistency. Then, approximately 0.25 g (dry basis) of these fibers were stirred with 25 ml of 0.25 M hydroxylamine hydrochloride solution at pH 4 for at least 2 h before the fibers were separated from the solution by filtration using a pre-weighed filter paper. The exact mass of the fibers was then determined by oven-drying of the filter paper and the carbonyl amount was determined by titration back to pH 4 with 0.10 M sodium hydroxide.)

A furnish made of CTMP fibres (600 ml CSF) and some of the above modified cellulose pulp (5% and 10% of the dry weight) were mixed gently for 15 min. Then the mixture was moved to an already made SDS-foam and stirred at 3200 rpm until a foam density of 320-380 kg/m$^3$ was reached and the foam was stabilised. The foam was subsequently decanted into the foam forming mould and filtrated through a wire using vacuum of −0.3 bar. The obtained sheets were wet-pressed and dried with a Kodak drum dryer.

The delamination strength of the sample was measured, and compared with a reference sample, which had no modified pulp added but which was otherwise identical and manufactured in the same way as above. The delamination strength of the sample was much higher than that of the reference sample, and also higher than that of other samples being similar but with the essential difference that they had cellulose nanofibrils (CNF, CMF) added instead of the modified pulp, at amounts up to 20 wt-% of the cellulose content.

Figure 6:
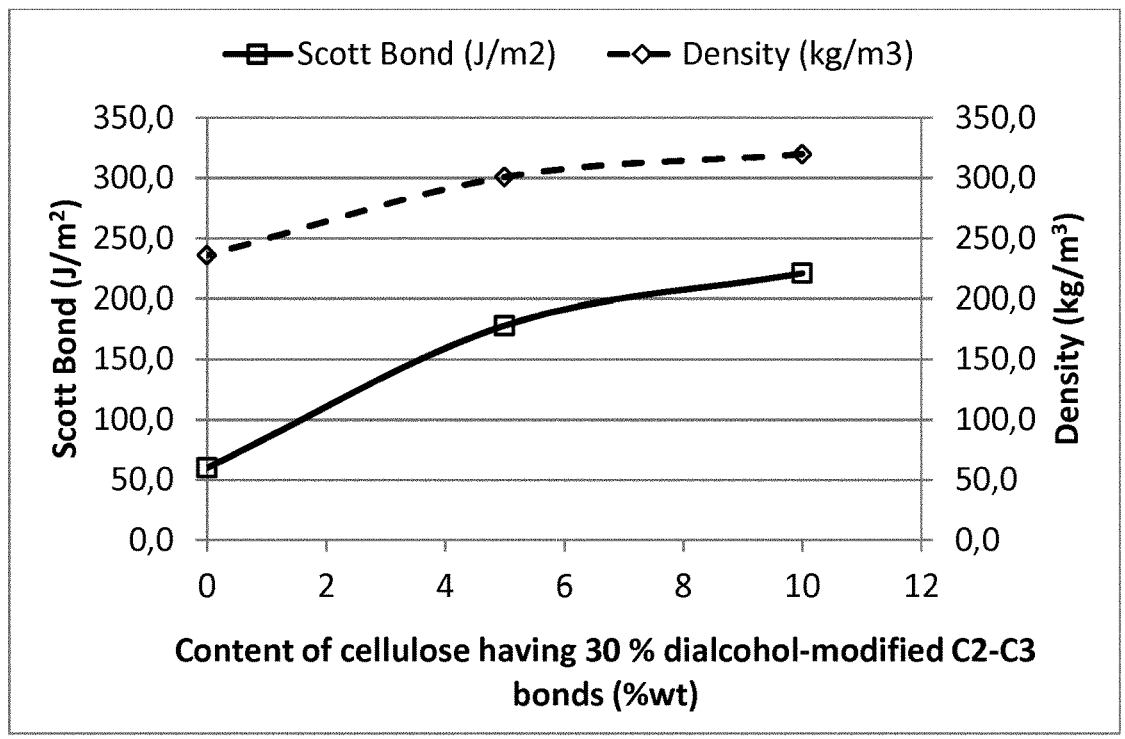
FIG. 6 shows a diagram wherein the Scott Bond delamination strength values of a foam-formed cellulose material of the present invention (Example 1), as well as its densities, are plotted versus the content of dialcohol-modified cellulose, based on the added amount of such modified pulp, which has about 30% of the total of the initial oxidizable C2-C3 bonds, oxidized and reduced into dialcohol cellulose.

The results are visualised in FIG. 6, showing a diagram where the Scott Bond delamination strength, and the density, of the foam-formed cellulose material is plotted versus the content of modified pulp. The actual degree of conversion into dialcohol cellulose, at the addition of 5 and 10 weight-% of modified pulp, respectively, is not exactly known, since the unmodified and the modified cellulose fibres may have had different densities, but could approximately be estimated to lie somewhere between 1 and 3%, as calculated on the total number of oxidizable C2-C3 bonds in the cellulose molecules. The majority of the cellulose fibre composition is accordingly unmodified cellulose, and only a minor part of all available oxidizable bonds of the molecules therein, were converted into dialcohol cellulose.

Figure 7:
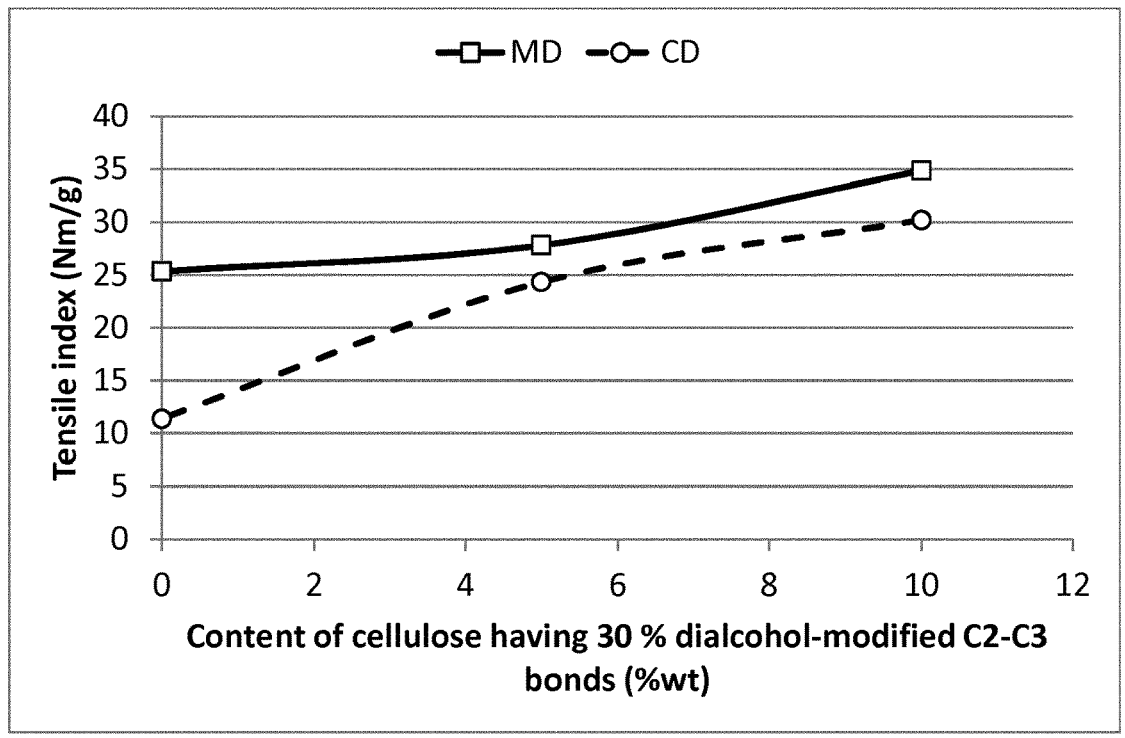
FIG. 7 shows a diagram wherein the values of the tensile index, i.e. the tensile strain normalized by grammage weight ($g/m^2$), of a foam-formed cellulose material of the present invention (Example 1), are plotted versus different added amounts of the dialcohol-modified cellulose, which has about 30% of the total of the initial oxidizable C2-C3 bonds, oxidized and reduced into dialcohol cellulose.
Figure 8:
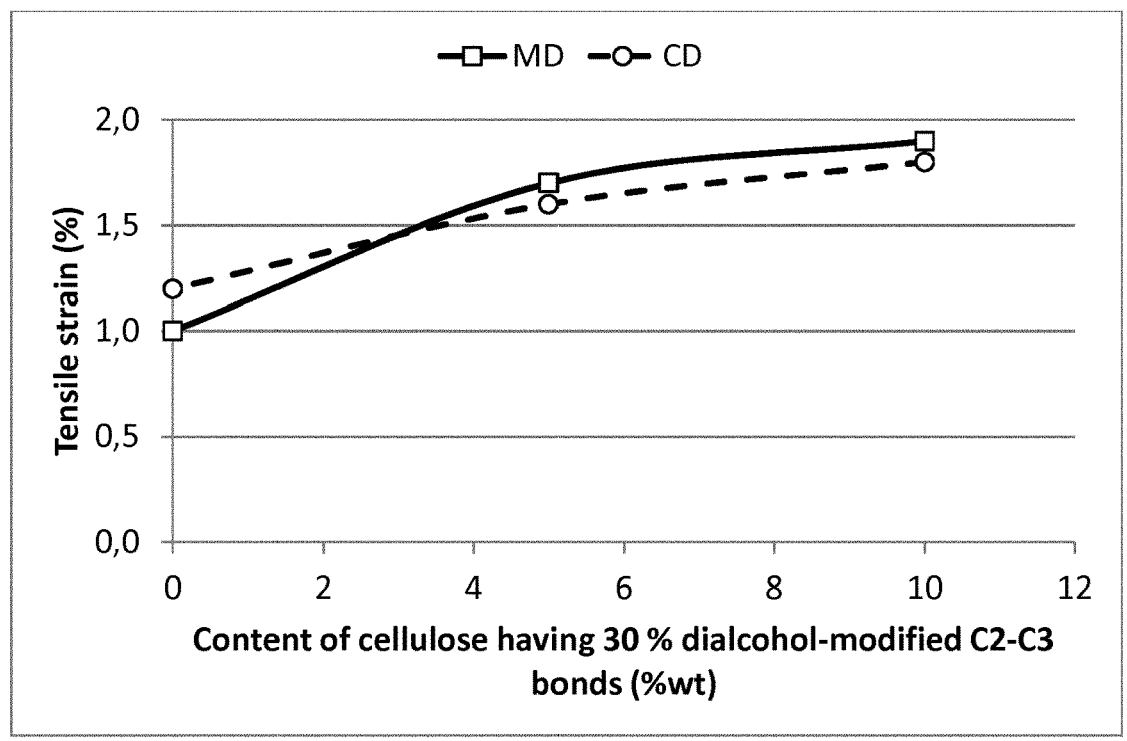
FIG. 8 shows a diagram wherein the tensile strain values of a foam-formed cellulose material of the present invention (Example 1), are plotted versus different added amounts of the dialcohol-modified cellulose, which has about 30 of the total of the initial oxidizable C2-C3 bonds, oxidized and reduced into dialcohol cellulose.

In addition, the foam-formed cellulose sheet samples obtained remarkably improved tensile strength properties. This is shown in the diagram of FIG. 7, by plotting the tensile strength normalized by grammage weight (g/m$^2$), i.e. the tensile index, versus the content of modified cellulose pulp. In the diagram of FIG. 8, the tensile strain plotted versus the modified cellulose content is shown.

Figure 9:
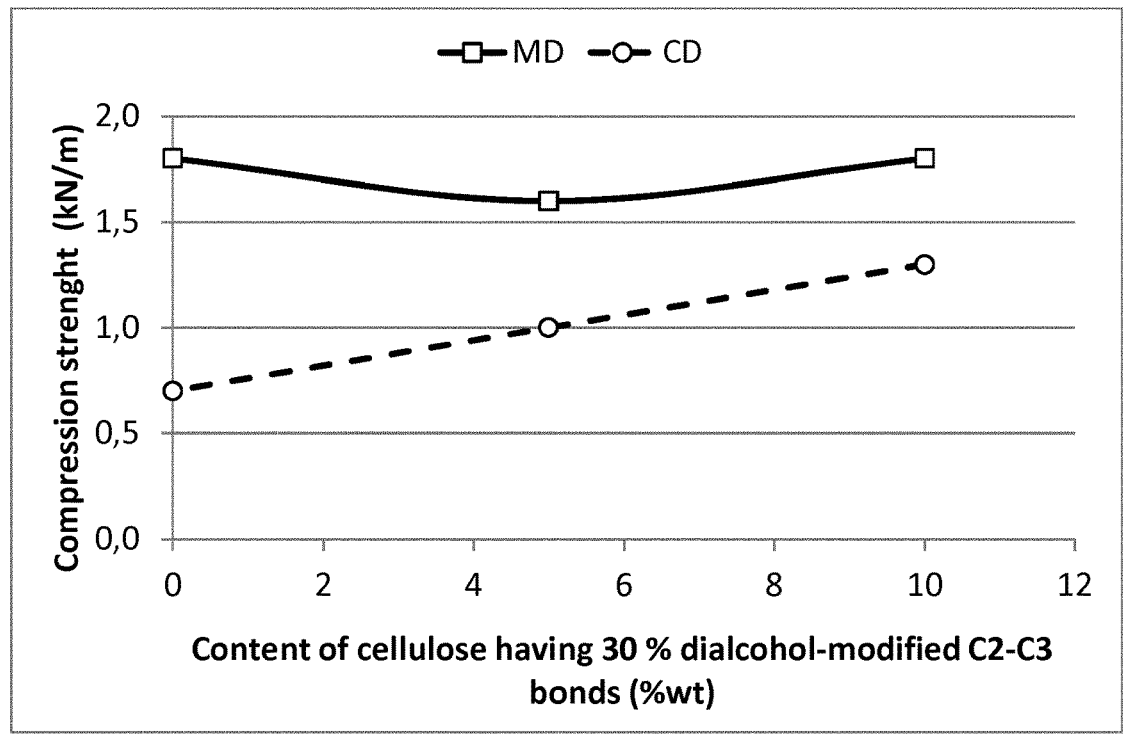
FIG. 9 shows a diagram wherein the compression strength values in MD and CD of a foam-formed cellulose material of the present invention (Example 1), are plotted versus different added amounts of the dialcohol-modified cellulose, which has about 30% of the total of the initial oxidizable C2-C3 bonds, oxidized and reduced into dialcohol cellulose.

The diagram of FIG. 9 further shows the improvement of compression strength properties of the samples having 5 and 10 wt % of added modified cellulose. The compression strength in the cross direction (CD) of a bulk layer is supporting the stacking strength of packages made from a laminated material comprising the bulk layers.

The underlying data to the diagrams of FIGS. 6 to 9 are provided in Table 1.

TABLE 1

| Property | 100% CTMP | 95% CTMP + 5% cellulose having 30% dialcohol-modified C2-C3 bonds | 90% CTMP + 10% cellulose having 30% dialcohol-modified C2-C3 bonds |
|---|---|---|---|
| Grammage (g/m$^2$) | 131.0 | 86.3 | 86.1 |
| Thickness (um) | 557.0 | 286.8 | 269.3 |
| Density (kg/m$^3$) | 236 | 301 | 320 |
| Young's modulus MD (MPa) | 1016 | 1023 | 1217 |
| Young's modulus CD (MPa) | 396 | 892 | 1056 |
| Tensile strength MD (kN/m) | 3.3 | 2.4 | 3.0 |
| Tensile strength CD (kN/m) | 1.5 | 2.1 | 2.6 |
| Tensile strain MD (%) | 1.0 | 1.7 | 1.9 |
| Tensile strain CD (%) | 1.2 | 1.6 | 1.8 |
| Compression strength MD (kN/m) | 1.8 | 1.6 | 1.8 |
| Compression strength CD (kN/m) | 0.7 | 1.0 | 1.3 |
| z-strength (kPa) | — | 266 | 297 |
| Internal bond strength (J/m$^2$) | 60 | 178 | 221 |

Example 2

Similar blends, as made in Example 1, of chemithermo-mechanical pulp (CTMP, freeness 600 ml) with the modified pulp, and/or with highly refined hardwood pulp, were mixed and foamed. Retention chemicals such as cationic starch (CS) and retention aid (RA) were added to the foamed composition in the order: CS at 0 s, RA 1 (cationic polyacrylamide 0.4 kg/t) at 5 s, RA 2 (microparticles "Perform® SP7200" from Hercules, 0.4 kg/t) at 10 s and mixing was stopped at 15 s. Finally the pulp foam was moved to the sheet mold and sheets were made.

The results concerning Scott Bond delamination strength and tensile strain showed the same improvement trend as in Example 1. Thus, the effect from adding a modified cellulose containing dialcohol cellulose was still evident, independently of additive amounts of starch and other retention additives.

Figure 10:
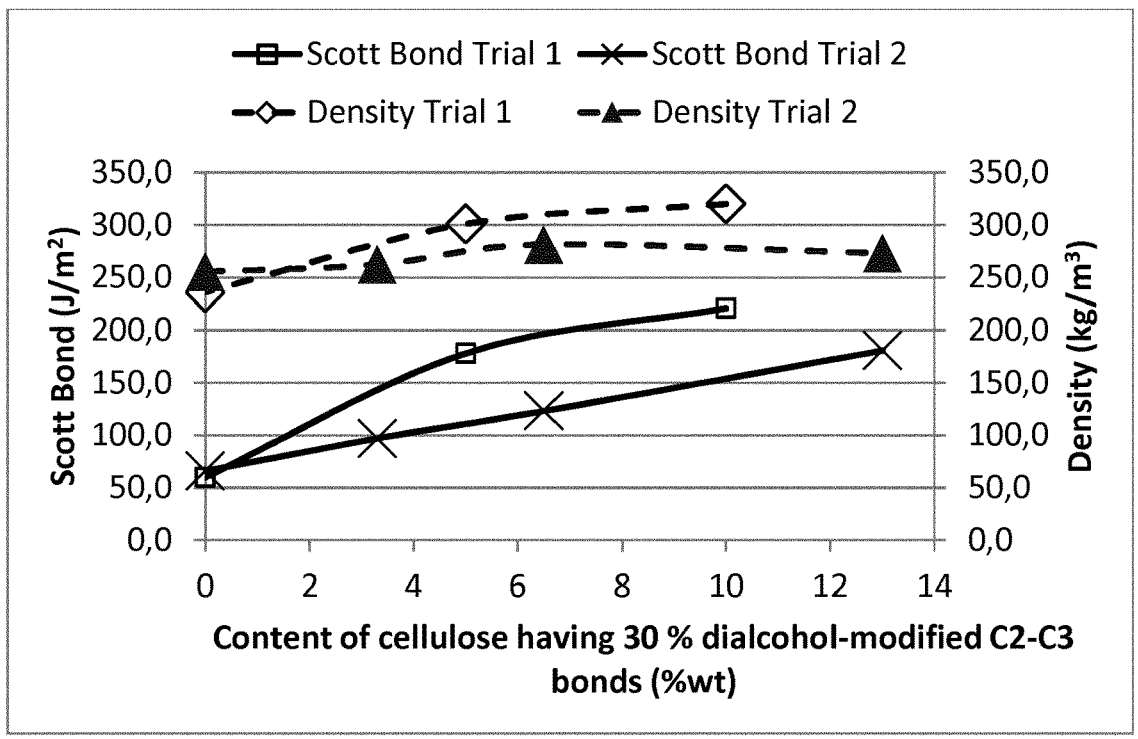
FIG. 10 shows a diagram wherein the Scott Bond, delamination strength, and density values of a foam-formed cellulose material of the present invention (both Examples 1 and 2), are plotted versus different added amounts of the dialcohol-modified cellulose, which has about 30% of the total of the initial oxidizable C2-C3 bonds, oxidized and reduced into dialcohol cellulose.

FIG. 10 shows the delamination strength versus the content of dialcohol modified cellulose, and in comparison with the results from Example 1, the delamination strength of the samples from Example 2 seems to start at lower level, but improves at a similar rate with an increasing amount of added modified pulp.

Figure 11:
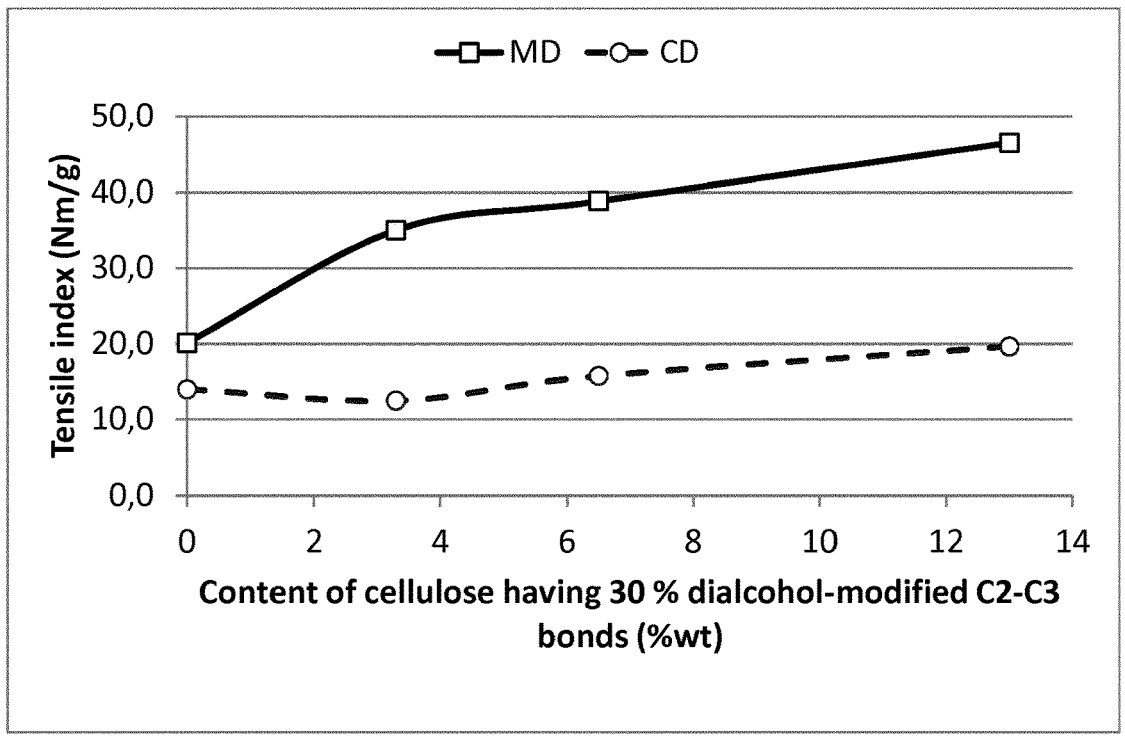
FIG. 11 shows a diagram wherein the values of the tensile index, i.e. the tensile strain normalized by grammage weight (g/m$^2$), of a foam-formed cellulose material of the present invention (Example 2), are plotted versus different added amounts of the dialcohol-modified cellulose, which has about 30% of the total of the initial oxidizable C2-C3 bonds, oxidized and reduced into dialcohol cellulose.
Figure 12:
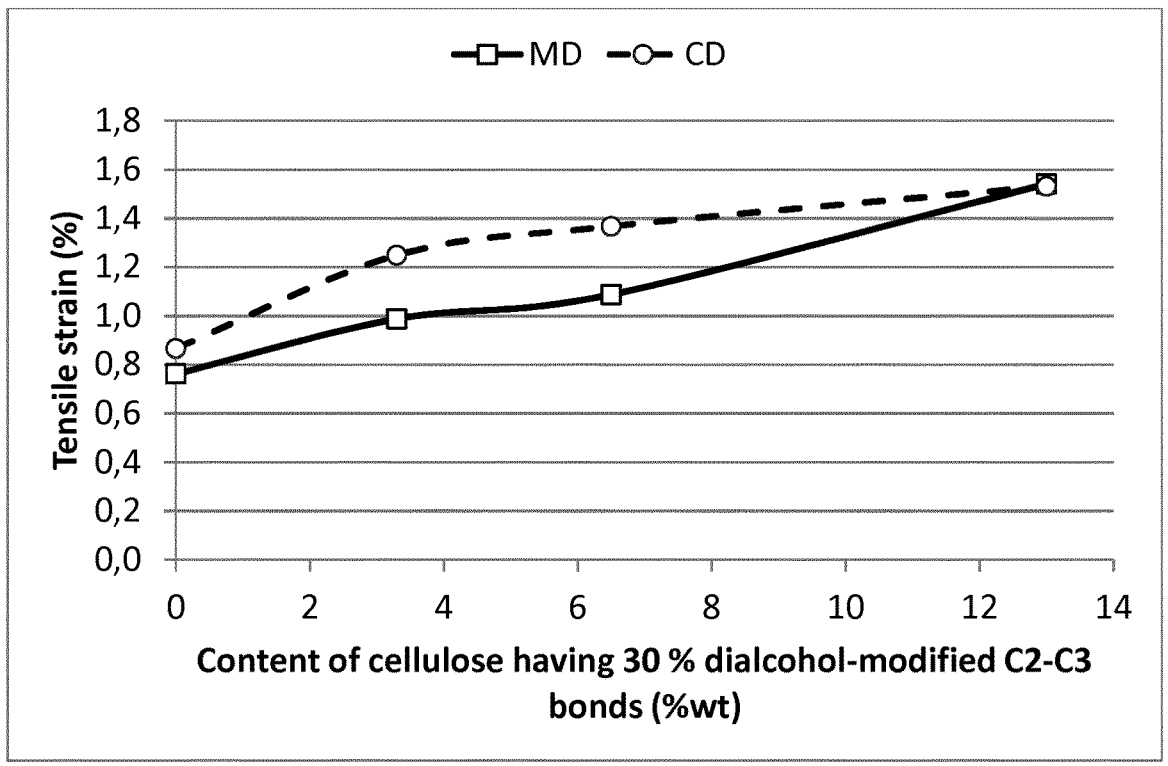
FIG. 12 shows a diagram wherein the values of tensile strain of a foam-formed cellulose material as of the present invention (Example 2) are plotted versus different added amounts of the dialcohol-modified cellulose, which has about 30% of the total of the initial oxidizable C2-C3 bonds, oxidized and reduced into dialcohol cellulose.
Figure 13:
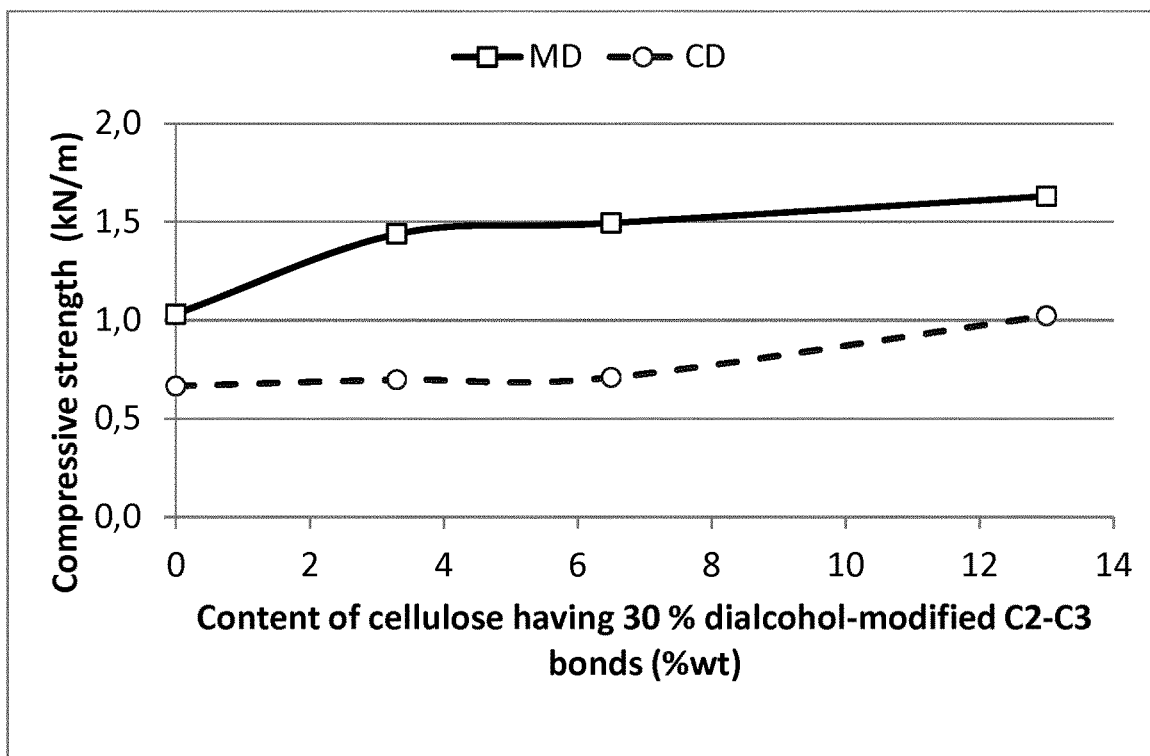
FIG. 13 shows a diagram wherein the compression strength values in MD and CD of a foam-formed cellulose material of the present invention (Example 2), are plotted versus different added amounts of the dialcohol-modified cellulose, which has about 30% of the total of the initial oxidizable C2-C3 bonds, oxidized and reduced into dialcohol cellulose.

The improvement of the mechanical properties is not equally and generally evident in the second Example trial, however a clear improvement trend is seen regarding tensile index (FIG. 11), the tensile strain (FIG. 12) and compression (FIG. 13). An improvement is achieved in both MD and CD directions, as shown in the figures.

Figure 14:
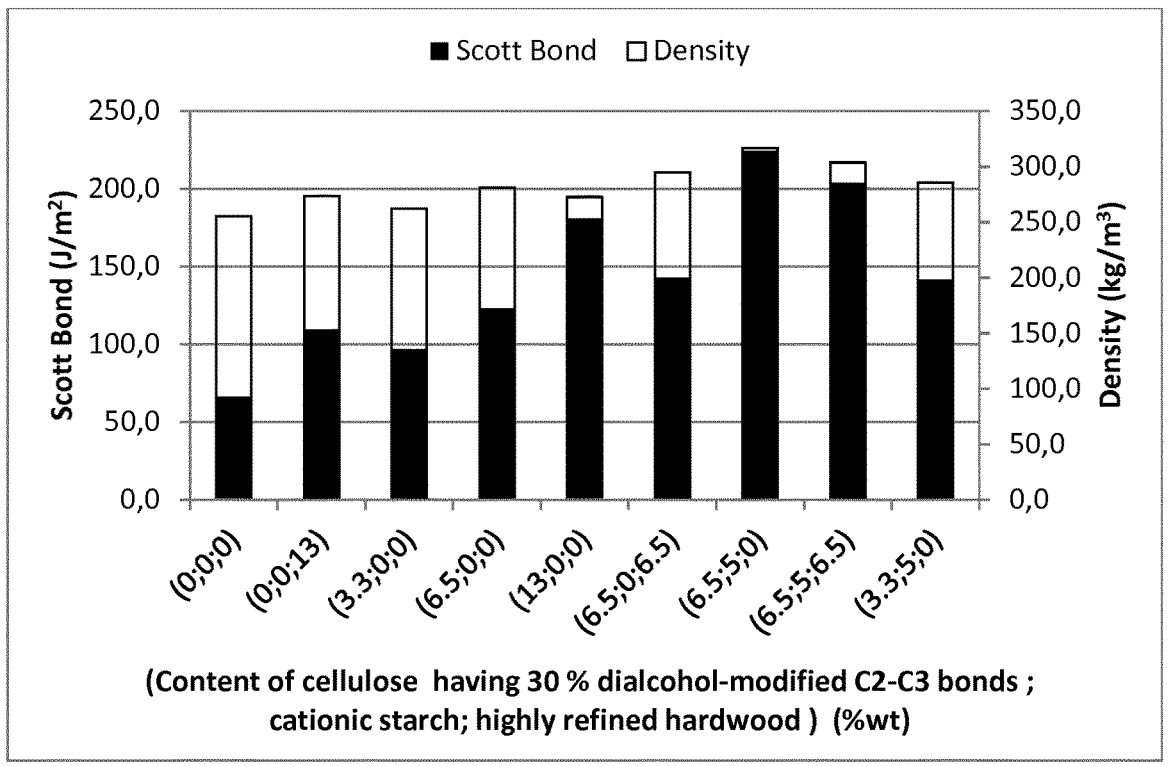
FIG. 14 shows a diagram of the Scott Bond delamination strength of a foam-formed cellulose material with different amounts and types of additives added, at different added amounts of the dialcohol-modified cellulose which has about 30% of the total of the initial oxidizable C2-C3 bonds, oxidized and reduced into dialcohol cellulose.

The diagram in FIG. 14 shows a clear increase in the delamination strength with addition of modified pulp containing dialcohol cellulose. The addition of cationic starch further boosts the delamination strength but also slightly increases the density. Adding starch is more efficient in order to further improve the delamination resistance than adding highly refined hardwood fibres. The modified pulp is more efficient as a strengthening additive than the highly refined hardwood fibres, as roughly shown in that a similar delamination resistance can be reached with half the amount of material, i.e. about 5 wt % modified fibres provide the same positive effect as 10 wt % of highly refined hardwood fibres. It can be concluded that the addition of starch works very well together with the addition of dialcohol cellulose, and even with a slightly synergetic effect.

In previous research, the properties of foam-formed cellulose, in the lamination operation during the conversion of packaging materials into a laminated packaging material, was investigated.

In order to analyze the effect of thermal and mechanical loading on the foam-formed cellulose during lamination, tests were conducted on various low density materials. The materials tested were foam-formed cellulose, and foamed polypropylene. Lamination of packaging material structures was done in a flexible lab laminator with two extrusion coating stations. The laminator settings were about 100 m/min web speed, 250-275 N web tension and the reference nip load was 25 N/mm. In each extrusion coating operation, 15-20 g/m$^2$ of LDPE was melt extruded onto the layer of foam-formed cellulose on the respective sides, at a melt extrusion temperature of about 320° C. The original thickness before lamination and the thickness after lamination were optically measured by using a microscope Olympus BX51. Sample preparation was done by using a microtome.

Generally, it was seen that the remaining thickness of foam-formed cellulose is substantially higher compared to a corresponding laminate variant with foamed polymer materials.

It was also concluded that lamination by extrusion coating works well with foam-formed cellulose having a density of 200 kg/m$^3$, such as 300 kg/m$^3$, or higher. Laminates having lower density layers of foam-formed cellulose are more sensitive to lamination heat and pressure, and show higher reduction of the thickness of the foam-formed cellulose material.

Furthermore, it was seen that the thickness reduction of a polymer foam is permanent, due to melting and re-shaping of the heated polymer foam cells, while there is a spring-back effect in the foam-formed cellulose, such that the thickness reduction during lamination is reversed to a final thickness which is only reduced by about 10-15% in a reference nip at densities around 300-400 kg/m$^3$. The higher the density of a foam-formed cellulose, the better this spring-back effect, or Z-directional compression strength.

Figure 15:
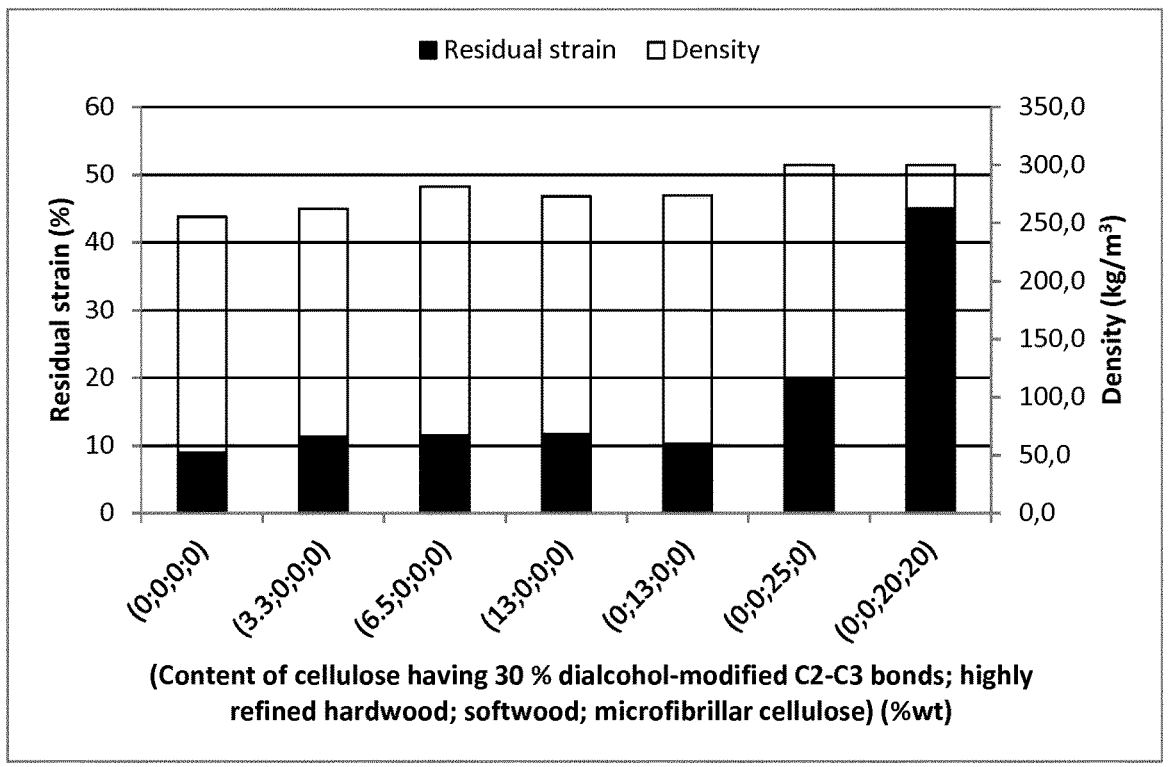
FIG. 15 shows a diagram of the residual strain after compression in the thickness direction, of a foam-formed cellulose material with different amounts and types of additives added, at different added amounts of the dialcohol-modified cellulose, which has about 30% of the total of the initial oxidizable C2-C3 bonds, oxidized and reduced into dialcohol cellulose.

With foam-formed cellulose of the present invention, it was seen that the lamination pressure resistance was relatively higher, i.e. the thickness reduction after lamination was significantly lower in the case of the invention, than in the case of samples having different additives, such as soft wood pulp or nano-/micro-fibrillar cellulose (CNF/CMF), for the purpose of improving the delamination resistance. This is illustrated by the diagram in FIG. 15.

Thus, the residual strain after compression in the thickness direction can give an indication of the thickness reduction which can occur during lamination. The lower the residual strain is the more efficient the spacer or bulk layer is.

The residual strain in z-direction (thickness direction) after a specified load on the sample was determined with Lloyd LR10K loading device. The sample area exposed to loading was 15.2 cm$^2$, with a circular radius of 22 mm. Samples were cut to the same size as the pressing plates. A sample was placed onto the loading table and a maximum pressure of 2 MPa (force 3041 N) was applied on the sample for a period of 1 s. The relative change was calculated with the initial thickness of the sheet (measured with a separate standard device) and the reading of displacement sensor showing the absolute thickness change in the compression. The residual strain was determined as the point where there was no additional clear drop in the loading force. At least five parallel measurements were carried out in separate points.

The addition of dialcohol-modified cellulose pulp and/or highly refined hardwood kraft fibres only slightly increases the residual strain. However if softwood kraft fibres and in particular softwood fibres combined with microfibrillar cellulose are added, the residual strain increases significantly lowering the efficiency of the foam formed cellulose spacer or bulk layer in consequence.

Figure 16:
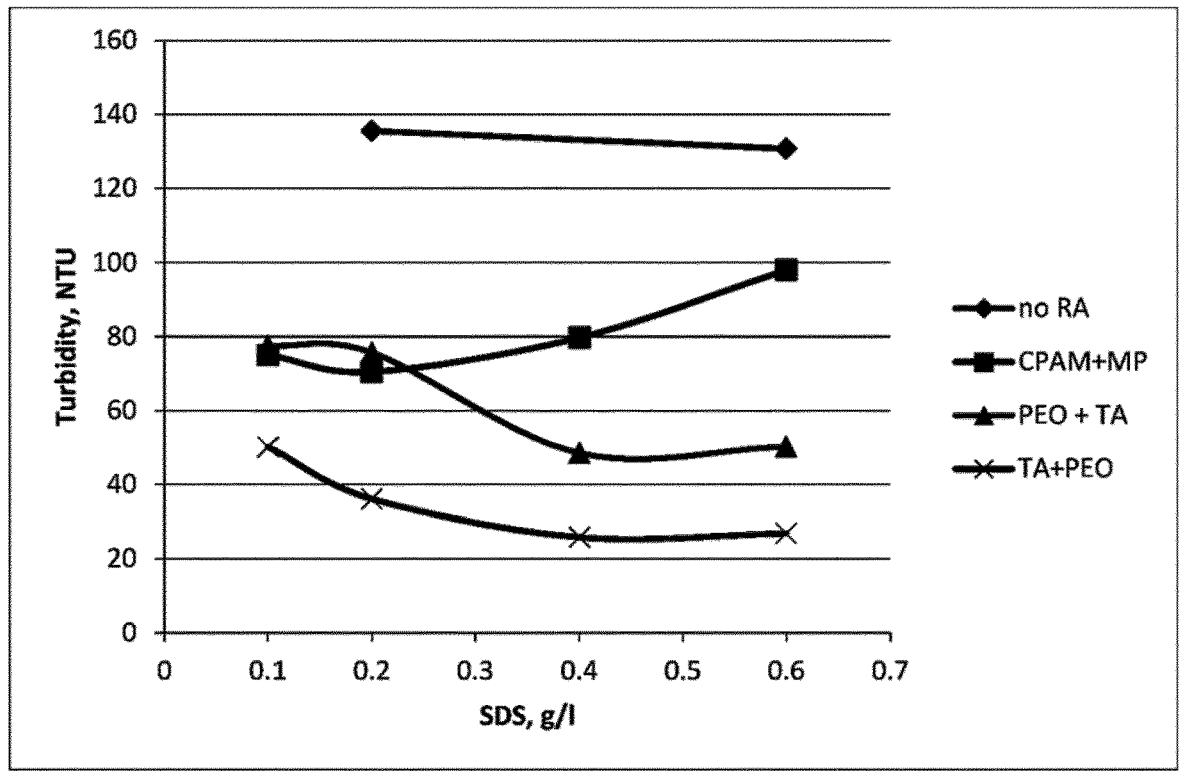
FIG. 16 shows the turbidity of DDJ filtrates of pulp suspensions wherein different retention systems were used at different concentrations of SDS. Filled diamonds represent pulp suspensions to which no retention system was added; filled squares represent pulp suspensions to which CPAM was added before the microparticles were added; filled triangles represent pulp suspensions to which PEO was added before TA was added; and x denote pulp suspensions to which TA was added before PEO was added. The dose of each retention aid component, i.e. CPAM, microparticles, PEO and TA was 0.3 kg/t of dry pulp.

FIG. 16 shows the effect of the SDS surfactant amount on turbidity (value is relative to the amount of solids that went through the 100 mesh wire) for different retention systems. The pulp contained 80% chemithermomechanical pulp (CTMP) and 20% heavily refined hardwood pulp (hrHW). The turbidity was measured using nephelometer and the result is expressed as nephelometric turbidity units (NTU). High turbidity means low retention. The turbidity was the highest (=lowest retention), when retention aids were not used (filled diamonds). The amount of surfactant (SDS) had no effect on turbidity in these test points. With low SDS concentration, 0.1-0.2 g/l, the CPAM+MP system (filled squares) and the PEO+TA system (filled triangles) gave the same retention. However, when the SDS content was increased, the retention decreased (reflected by increased turbidity) for the CPAM+MP system and improved (reflected by decreased turbidity) for the PEO+TA system. In the case where TA was added before PEO (x), the retention was the best and was improved further with increasing the SDS content. The results showed that the non-cationic TA+PEO system is very efficient in foam forming, especially when the SDS content is high.

Figure 17:
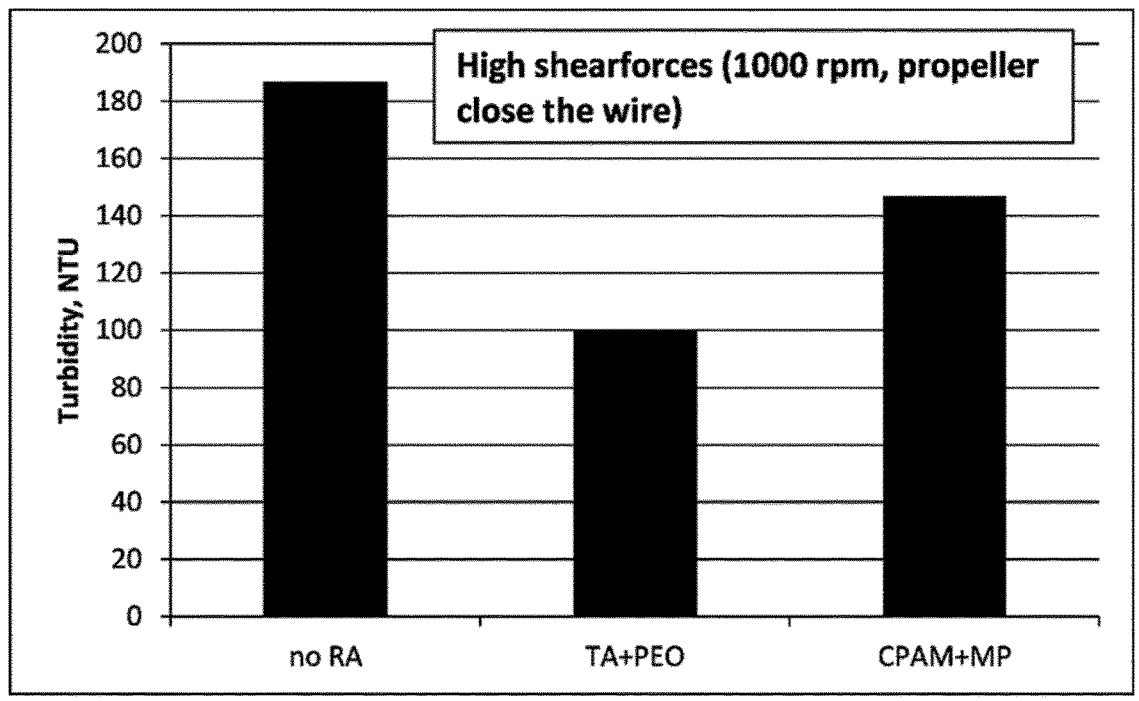
FIG. 17 shows the turbidity of DDJ filtrates of pulp suspensions with different retention systems at high shear forces.

As can be seen in FIG. 17, the TA+PEO-system seems to work better than the CPAM+MP system when the suspension is subjected to high shear forces. The experiment was performed similarly to the one of FIG. 2, but the stirrer 1 was set close to the wire 3 and the stirrer 1 was on with 1000 rpm during the filtration of foam.

FIG. 18 shows a flowchart illustrating one embodiment of the method according to the invention.

1: Air
2: Surfactant
3: Cellulose fibre (such as coarse CTMP)
4: Cellulose reinforcement fraction (di-alcohol modified cellulose)
5: Foam generation, In a separate unit (such as a tank)
6: Fibre furnish mixing
7: Foam circulation
8: Headbox feed flow
9: Distribution onto a forming wire (headbox)
10: Forming section
11: Wet pressing
12: Drying
13: Foam formed cellulosic fibre material
14: Cationic starch
15: CPAM
16: Microparticle
17: AKD
18: As an alternative retention system instead of using CPAM and microparticle
18a: TA
18b: PEO Foam generation: surfactant and gas (air) is mixed with water, the foam density will be dependent on the amount of surfactant and mixing energy. Stock preparation: the fibre components are prepared to required freeness (by refining)

and mixed to a stock. Foam and stock mixing: Foam and fibre stock are combined (fibrous foam). Headbox feed flow: Fibrous foam is pumped towards the headbox and the needed chemicals are added into the headbox feed flow. Dewatering including drying: Foam is removed in the forming section by using suction boxes and forming wire (fibres retain on the forming wire while the foam goes through the wire and to foam circulation), by mechanical compression in wet pressing and by heating up the moist board, e.g. with drying cylinders.

Packaging containers of the type Tetra Brik® 250 ml were prepared from a laminated packaging material having a bulk layer from the above foam-formed cellulose compositions. The packaging material comprised 12 g/m² of an outermost thermoplastic layer of an LDPE, which is arranged to become the outside of the package. Additional layers starting from the outermost layer were: 70 g/m² white paper; 15 g/m² LDPE as binding layer; a bulk layer of foam-formed cellulose, 332 kg/m³, 243 µm; a laminate layer of 20 g/m² LDPE and a barrier layer of about 6 µm aluminium foil, 6 g/m² adhesive (Primacor™ 3440) and 19 g/m² heat-sealing layer of a blend of a LDPE (30 w %) and a metallocene catalyzed linear, low density polyethylene. The packaging material was obtained on a roll which was processed in accordance with the conventional manufacturing process in order to generate a 250 ml Tetra Brik® packaging containers containing orange juice. From this test, it was concluded that the amount of cellulose fibres could be reduced by at least 25%, as compared to a corresponding material having one conventional paperboard layer in a corresponding traditional packaging laminate with 12 g/m² LDPE outermost layer, 200 g/m² paperboard, 20 g/m² LDPE laminate layer, 6 um aluminium foil, 6 g/m² adhesive (Primacor™ 3440) and 19 g/m² heat sealing layer of a blend of a LDPE (30 w %) and a metallocene catalyzed linear, low density polyethylene.

Thus, in addition to further reducing the amount of material used in the laminated packaging material, the bulk layer of the invention is still entirely based on natural, renewable sources, i.e. cellulose.

In order to determine the density of the bulk layer different procedures may be applicable depending on the layers of the packaging material. The density (kg/m³) of the bulk layer comprising foam-formed cellulose in a multilayered packaging material can be determined by dividing the grammage (kg/m²) by the thickness (m). The thickness can be obtained by using a standard microscope. The separate grammage can be obtained by a standardized separation procedure using 1 dm² circular discs of packaging material. All measurements are performed in a controlled environment of 23° C. and 50% relative humidity. The total grammage of the packaging material is measured using a balance (0.001 g accuracy). The packaging material is split at the foam-formed cellulose layer to obtain two plies. The two plies are place in a beaker containing copper ethylene diamine solution until all the cellulose fibers are easily removed. Thereafter the remaining grammage is determined and the foam-formed cellulose grammage can be calculated by subtracting the remaining grammage from the total grammage. Whenever at least one of the plies contain an aluminium layer the procedure should be to measure the grammage of each ply and use an acetic acid solution instead of the copper ethylene diamine solution and leave the plies for 3 to 4 hours. The layers of the plies of packaging material are split to individual layer and the corresponding individual layer grammage is determined and subtracted from the total grammage. Whenever an additional layer of paper is present the method above is applied but the paper layer is removed, for example by grinding. The weight of the ground material is determined and appropriately corrected in the density calculation of the bulk layer.

The invention is not limited by the embodiments shown and described above, but may be varied within the scope of the claims. Modifications and alterations, obvious to a person skilled in the art, are possible without departing from the concept as disclosed in the appended claims.

The invention claimed is:

1. Method for manufacturing a foam-formed low-density material of cellulose fibres to be used in packaging material for producing packaging containers suitable for liquid and semi-liquid food products, comprising
   a. forming an aqueous foam comprising water and a foaming agent,
   b. adding cellulose fibres to the aqueous foam, thus forming a fibrous foam composition, the cellulose fibres added to the aqueous foam comprising both modified cellulose fibres as a cellulose reinforcement fraction and coarse, unmodified cellulose fibres, the modified cellulose fibres containing dialcohol cellulose, the coarse, unmodified cellulose fibres being selected from the group consisting of mechanical, chemi-mechanical, thermomechanical, chemithermomechanical pulp (CTMP) fibres and Neutral Sulfite Semi Chemical (NSSC) pulp fibres;
   c. distributing the fibrous foam composition onto a substrate or into a mould,
   d. reducing the amount of water in the distributed fibrous foam composition to obtain the foam-formed low-density material of cellulose fibres in its final shape which is usable in the packaging material for producing the packaging containers suitable for liquid and semi-liquid food products, and
   e. optionally, drying the foam-formed low density material of cellulose fibres;
   wherein a final content of the dialcohol cellulose, based on the total number of C2-C3 bonds in a final fibrous foam composition, is 0.5 to 5%.

2. Method as claimed in claim 1, comprising mixing unmodified cellulose with the modified cellulose fibres, the mixing of the unmodified cellulose with the modified cellulose fibres taking place before the adding of the cellulose fibres to the aqueous foam.

3. Method as claimed in claim 1, wherein the fibrous foam composition comprises from 0.1 to 7 wt % of cellulose fibre.

4. Method as claimed in claim 1, wherein a further cellulose reinforcement fraction is added, the reinforcement fraction being a heavily refined fibre component chosen from heavily refined chemical pulp having a SR range higher than SR°80 and heavily refined chemithermomechanical pulp (hrCTMP) having a CSF less than 70 mL.

5. Method as claimed in claim 1, wherein the fibrous foam composition comprises from 0.01 to 1000 ppm of the foaming agent.

6. Method as claimed in claim 1, wherein the fibrous foam composition comprises from 20 to 80 volume-% of air.

7. Method as claimed in claim 1, wherein the foaming agent is selected from the group consisting of anionic surfactants.

8. Method as claimed in claim 1, wherein the foaming agent is selected from the group consisting of sodium lauryl (dodecyl) sulphate (SLS, SDS) and sodium laurylethersulfate (SLES).

9. Method according to claim 1, wherein the density of the fibrous foam composition to be reduced from an amount of water is approximately 600-750 kg/m³, and wherein the average bubble size is 100 μm or below.

10. A foam-formed low density material of cellulose fibres produced by the method as claimed in claim 1, having a density from 100 to 700 kg/m³.

11. A foam-formed low density material having a density lower than 450 kg/m³, of cellulose fibres as claimed in claim 10, having a tensile index (MD) of above 20 Nm/g (kNm/kg).

12. A cellulose bulk sheet for a packaging material, comprising the foam-formed material of cellulose fibres as claimed in claim 10, laminated or arranged in layer contact with a further sheet of a different cellulose material.

13. A cellulose bulk sheet for a packaging material, as claimed in claim 12, wherein the further sheet of a different cellulose material is a paper.

14. Laminated packaging material comprising a cellulose bulk sheet as claimed in claim 10, wherein the bulk sheet is laminated to at least one layer of polymer.

15. Laminated packaging material as claimed in claim 14, further comprising an oxygen barrier.

16. Packaging container for liquid- or semi-liquid food comprising the laminated packaging material as defined in claim 14.

17. Method for manufacturing a foam-formed low-density material of cellulose fibres to be used in packaging material for producing packaging containers suitable for liquid and semi-liquid food products, the method comprising
   a. forming an aqueous foam comprising water and a foaming agent,
   b. adding cellulose fibres to the aqueous foam, thus forming a fibrous foam composition, the cellulose fibres added to the aqueous foam comprising both modified cellulose fibres as a cellulose reinforcement fraction and coarse, unmodified cellulose fibres, the modified cellulose fibres comprising bleached, chemical pulp fibres and containing dialcohol cellulose, the coarse, unmodified cellulose fibres being selected from the group consisting of mechanical, chemi-mechanical, thermomechanical, chemithermo-mechanical pulp (CTMP) fibres and Neutral Sulfite Semi Chemical (NSSC) pulp fibres;
   c. distributing the fibrous foam composition onto a substrate or into a mould,
   d. reducing the amount of water in the distributed fibrous foam composition to obtain the foam-formed low-density material of cellulose fibres in its final shape which is usable in the packaging material for producing the packaging containers suitable for liquid and semi-liquid food products, and
   e. optionally, drying the foam-formed low density material of cellulose fibres;
   wherein a final content of the dialcohol cellulose, based on the total number of C2-C3 bonds in a final fibrous foam composition, is 0.5 to 5%.

18. Method as claimed in claim 1, further comprising preparing the modified cellulose fibres by partly oxidizing unmodified cellulose into dialdehyde cellulose, and subsequently reducing the dialdehyde cellulose into dialcohol cellulose, to a conversion degree of about 20-45%, based on the initial number of oxidizable C2-C3 bonds in the modified cellulose.

19. Method as claimed in claim 1, wherein the final content of the dialcohol cellulose, based on the total number of C2-C3 bonds in the final fibrous foam composition, is 0.99 to 3.9%.

20. Method as claimed in claim 17, wherein the final content of the dialcohol cellulose, based on the total number of C2-C3 bonds in the final fibrous foam corn position, is 0.99 to 3.9%.

* * * * *